United States Patent
Itogawa et al.

(10) Patent No.: US 11,955,904 B2
(45) Date of Patent: Apr. 9, 2024

(54) DC/DC CONVERTER AND POWER CONVERSION DEVICE

(71) Applicant: Mitsubishi Electric Corporation, Tokyo (JP)

(72) Inventors: Yuki Itogawa, Tokyo (JP); Yusuke Higaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 275 days.

(21) Appl. No.: 17/429,942

(22) PCT Filed: May 7, 2019

(86) PCT No.: PCT/JP2019/018215
§ 371 (c)(1),
(2) Date: Aug. 11, 2021

(87) PCT Pub. No.: WO2020/225842
PCT Pub. Date: Nov. 12, 2020

(65) Prior Publication Data
US 2022/0216805 A1 Jul. 7, 2022

(51) Int. Cl.
*H02M 7/538* (2007.01)
*H02M 1/32* (2007.01)
(Continued)

(52) U.S. Cl.
CPC ......... *H02M 7/53871* (2013.01); *H02M 1/32* (2013.01); *H02M 3/33584* (2013.01)

(58) Field of Classification Search
CPC .... H02M 1/0048; H02M 1/32; H02M 3/1582; H02M 3/28; H02M 3/3353;
(Continued)

(56) References Cited

U.S. PATENT DOCUMENTS

| 2015/0138843 | A1 | 5/2015 | Inoue |
| 2017/0358996 | A1* | 12/2017 | Higaki ................... H02M 1/38 |
| 2019/0288606 | A1 | 9/2019 | Higaki et al. |

FOREIGN PATENT DOCUMENTS

| CN | 107112903 A | 8/2017 |
| DE | 11 2013 003 974 T5 | 6/2015 |

(Continued)

OTHER PUBLICATIONS

International Search Report and Written Opinion dated Jul. 16, 2019, received for PCT Application PCT/JP2019/018215, Filed on May 7, 2019, 17 pages including English Translation.
(Continued)

*Primary Examiner* — Thienvu V Tran
*Assistant Examiner* — Johana Dumeng-Roman
(74) *Attorney, Agent, or Firm* — XSENSUS LLP

(57) ABSTRACT

In first power transmission in which power is transmitted from a first DC power source to a second DC power source, a control circuit performs on/off drive control of a positive electrode-side switching element and a negative electrode-side switching element in a first bridge circuit and a second bridge circuit and stops on/off drive of a positive electrode-side switching element and a negative electrode-side switching element in a third bridge. For a positive electrode-side switching element and a negative electrode-side switching element of a fourth bridge circuit, when a first power transmission amount by the first power transmission is greater than a predetermined first reference value, the control circuit performs on/off drive control, whereas when the first power transmission amount is smaller than the first reference value, the control circuit stops on/off drive.

11 Claims, 21 Drawing Sheets

(51) Int. Cl.
*H02M 3/335* (2006.01)
*H02M 7/5387* (2007.01)

(58) Field of Classification Search
CPC ......... H02M 3/33546; H02M 3/33584; H02M 7/53871; H02J 7/0068; H02J 7/342
See application file for complete search history.

(56) References Cited

FOREIGN PATENT DOCUMENTS

| | | |
|---|---|---|
| DE | 11 2017 003 632 T5 | 4/2019 |
| JP | 2017-147824 A | 8/2017 |
| JP | 2018-137894 A | 8/2018 |
| JP | 2018-157643 A | 10/2018 |
| WO | 2015/072009 A1 | 5/2015 |
| WO | 2018/016106 A1 | 1/2018 |

OTHER PUBLICATIONS

Notice of Reasons for Refusal dated Jan. 7, 2020, received for JP Application 2019-551719, 33 pages including English Translation.
Office Action dated Jan. 5, 2023 in German Patent Application No. 11 2019 007 292.7, 13 pages.
Office Action dated Nov. 22, 2023, in Chinese Application No. 201980095828.0, 20 pages.(with English Translation).

* cited by examiner

DC/DC CONVERTER AND POWER CONVERSION DEVICE

CROSS-REFERENCE TO RELATED APPLICATION

The present application is based on PCT filing PCT/JP2019/018215, filed May 07, 2019, the entire contents of which are incorporated herein by reference.

TECHNICAL FIELD

The present disclosure relates to a DC/DC converter and a power conversion device.

BACKGROUND ART

A DC/DC converter that performs bidirectional power transmission between two DC power sources is described, for example, in WO2018/016106 (PTL 1). In the DC/DC converter in PTL 1, a first converter of a full bridge circuit is provided on the first DC power source side and a second converter of the full bridge circuit is provided on the second DC power source side with a transformer interposed therebetween. Furthermore, a first reactor is provided between a first winding of the transformer and the first converter, and a second reactor is provided between a second winding of the transformer and the second converter.

In PTL 1, step-up operation is performed using the first reactor or the second reactor when voltage of the first DC power source or the second DC power source is higher than voltage generated in the first winding or the second winding of the transformer, that is, when the step-up operation is necessary. On the other hand, the step-up operation is not performed when voltage of the first DC power source or the second DC power source is lower than voltage generated in the first winding or the second winding of the transformer, that is, when step-down operation is necessary.

In the DC/DC converter described in PTL 1, an operation mode of performing step-up operation (step-up charge) and an operation mode of performing step-down operation (step-down charge) in first power transmission (charge of the second DC power source) in which power is transmitted from the first DC power source to the second DC power source, and an operation mode of performing step-up operation (step-up discharge) and an operation mode of performing step-down operation (step-down discharge) in second power transmission (discharge of the second DC power source) in which power is transmitted from the second DC power source to the first DC power source, that is, in total, four operation modes can be switched according to the duty ratio representing power transmission.

CITATION LIST

Patent Literature

PTL 1: WO2018/016106

SUMMARY OF INVENTION

Technical Problem

Unfortunately, in the DC/DC converter described in PTL 1, as will be explained in detail later, a circulating current path including the transformer without passing through either the first DC power source or the second DC power source may be formed in the operation mode of performing step-down operation with both of the upper arm and the lower arm kept in the off state in one bridge circuit on the power receiving side.

As a result, conduction loss is caused by current passing through the transformer, the DC reactor, and the semiconductor element, in a period of time in which both of the first bridge circuit and the second bridge circuit output zero voltage. At the same time, switching loss occurs when the on/off of the upper and lower arms is switched in the other bridge circuit on the power receiving side in the step-down operation mode.

In particular, in the operation modes of step-down charge and step-down discharge, the power transmission amount is smaller than in the operation modes of step-up charge and step-up discharge, and the conduction loss in the circulating current path and the switching loss on the power receiving side have a larger impact, leading to reduction in power conversion efficiency.

The present disclosure is made in order to solve such a problem and an object of the present disclosure is to improve power conversion efficiency in step-down operation with a small power transmission amount while enabling step-up operation and step-down operation in a DC/DC converter that performs bidirectional power transmission between first and second DC power sources.

SOLUTION TO PROBLEM

In an aspect of the present disclosure, a DC/DC converter that performs bidirectional power transmission between a first DC power source and a second DC power source includes a transformer, a first converter, a second converter, and a control circuit. The transformer has a first winding and a second winding magnetically coupled. The first converter is connected between the first DC power source and the first winding. The second converter is connected between the second DC power source and the second winding. The first converter includes a first bridge circuit and a second bridge circuit connected in parallel to each other to the first DC power source. Each of the first bridge circuit and the second bridge circuit has a positive electrode-side switching element and a negative electrode-side switching element connected in series between a positive electrode and a negative electrode of the first DC power source. The first winding is connected between a connection point of the positive electrode-side switching element and the negative electrode-side switching element of the first bridge circuit and a connection point of the positive electrode-side switching element and the negative electrode-side switching element of the second bridge circuit. The second converter includes a third bridge circuit and a fourth bridge circuit connected in parallel to each other to the second DC power source. Each of the third bridge circuit and the fourth bridge circuit has a positive electrode-side switching element and a negative electrode-side switching element connected in series between a positive electrode and a negative electrode of the second DC power source. The second winding is connected between a connection point of the positive electrode-side switching element and the negative electrode-side switching element of the third bridge circuit and a connection point of the positive electrode-side switching element and the negative electrode-side switching element of the fourth bridge circuit. The control circuit performs on/off drive control of the respective positive electrode-side switching elements and the respective negative electrode-side switching elements of the first converter and the second converter. In first power transmission in which power is transmitted from the first DC power source to the second DC power source, in the first converter, the control circuit performs DC/AC power conversion by performing on/off drive control of the positive electrode-side switching element and the negative electrode-side switching element in each of the first bridge circuit and the second bridge circuit. In the first power transmission, in the second converter, when a first power transmission amount by the first power transmission is greater than a predetermined first reference value, the control circuit stops on/off drive of the positive electrode-side switching element and the negative electrode-side switching element in the third bridge circuit and performs on/off drive control of the positive electrode-side switching element and the negative electrode-side switching element in the fourth bridge circuit, whereas when the first power transmission amount is smaller than the first reference value, the control circuit performs AC/DC power conversion by stopping on/off drive of the positive electrode-side switching element and the negative electrode-side switching element in both of the third bridge circuit and the fourth bridge circuit.

ADVANTAGEOUS EFFECTS OF INVENTION

According to the present disclosure, in a DC/DC converter that performs bidirectional power transmission between first and second DC power sources, while step-up operation and step-down operation is enabled, occurrence of circulating current between the first and second converters can be prevented by keeping the switching elements in the power receiving-side converter in the off state at the time of step-down operation. As a result, the power conversion efficiency in step-down operation with a small power transmission amount can be improved.

DESCRIPTION OF EMBODIMENTS

Figure 1:
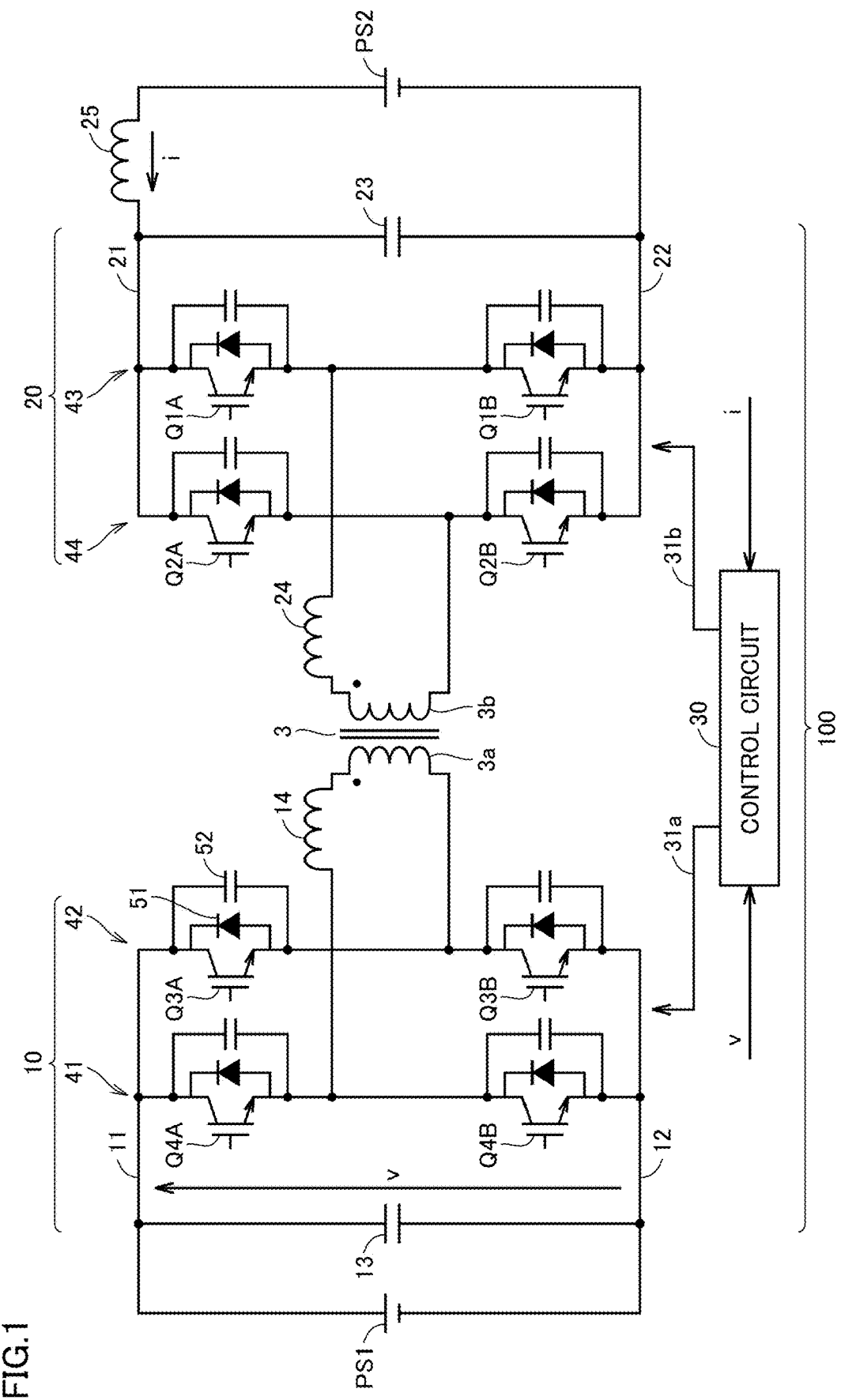
FIG. 1 is a schematic circuit configuration diagram of a DC/DC converter according to a first embodiment.

Embodiments of the present disclosure will be described in detail below with reference to the drawings. In the following, like or corresponding parts in the drawings are denoted by like reference signs and a description thereof is basically not repeated.

First Embodiment (Circuit Configuration) FIG. 1 is a schematic circuit configuration diagram of a DC/DC converter 100 according to a first embodiment. DC/DC converter 100 performs bidirectional power transmission between a first DC power source PS1 and a second DC power source PS2.

In the present embodiment, a description is premised on that second DC power source PS2 is configured with a battery. More specifically, DC/DC converter 100 operates as a battery charging/discharging device that charges and discharges the battery. In the following, first DC power source PS1 may be simply referred to as DC power source PS1, and second DC power source PS2 may be referred to as battery PS2.

As will be described below, the configuration of DC/DC converter 100 according to the present embodiment is similar to the DC/DC converter described in PTL 1.

DC/DC converter 100 includes a transformer 3, a first converter 10, a second converter 20, a first reactor 14, a second reactor 24, and a control circuit 30. Transformer 3 has a first winding 3a and a second winding 3b wound around a not-shown core. With electromagnetic induction between first winding 3a and second winding 3b magnetically coupled to each other, a circuit on the first winding 3a side connected to DC power source PS1 and a circuit on the second winding 3b side connected to battery PS2 can perform power transmission bidirectionally while being electrically insulated from each other.

First converter 10 is configured with a full bridge circuit including a first bridge circuit 41 and a second bridge circuit 42. First bridge circuit 41 includes semiconductor switching elements (hereinafter simply referred to as switching elements) Q4A and Q4B connected in series between a first positive electrode wire 11 and a first negative electrode wire 12. Second bridge circuit 42 includes switching elements Q3A and Q3B connected in series between first positive electrode wire 11 and first negative electrode wire 12.

In other words, first bridge circuit 41 is a series connection circuit of first switching element Q4A on the positive electrode side and first switching element Q4B on the negative electrode side. Second bridge circuit 42 is a series connection circuit of second switching element Q3A on the positive electrode side and second switching element Q3B on the negative electrode side.

First positive electrode wire 11 and first negative electrode wire 12 are electrically connected to the positive electrode and the negative electrode of DC power source PS1. The midpoint of first bridge circuit 41 and the midpoint of second bridge circuit 42 are respectively electrically connected to both terminals of first winding 3a. In each bridge circuit, the midpoint corresponds to a connection point between the positive electrode-side switching element and the negative electrode-side switching terminal. First converter 10 performs DC/AC bidirectional power conversion between DC power source PS1 and first winding 3a of transformer 3 through on/off control of switching elements Q3A, Q3B, Q4A, and Q4B.

Similarly, second converter 20 is configured with a full bridge circuit including a third bridge circuit 43 and a fourth bridge circuit 44. Third bridge circuit 43 includes switching elements Q1A and Q1B connected in series between a second positive electrode wire 21 and a second negative electrode wire 22. Fourth bridge circuit 44 includes switching elements Q2A and Q2B connected in series between second positive electrode wire 21 and second negative electrode wire 22. Third bridge circuit 43 is a series connection circuit of third switching element Q1A on the positive electrode side and third switching element Q1B on the negative electrode side. Fourth bridge circuit 44 is a series connection circuit of fourth switching element Q2A on the positive electrode side and fourth switching element Q2B on the negative electrode side.

In each of first bridge circuit 41, second bridge circuit 42, third bridge circuit 43, and fourth bridge circuit 44, a plurality of switching elements may be arranged on each of the positive electrode side and the negative electrode side. Switching elements Q1A to Q4A and Q1B to Q4B may be any switching elements that can be on/off controlled by a control signal from control circuit 30, such as insulated gate bipolar transistors (IGBTs) or metal oxide semiconductor field effect transistors (MOSFETs).

A diode 51 (hereinafter may be referred to as antiparallel diode 51) is connected in antiparallel with each of switching elements Q1A to Q4A and Q1B to Q4B. To turn on and off each of switching elements Q1A to Q4A and Q1B to Q4B, it is preferable to apply zero voltage switching in which terminal-to-terminal voltage of the switching element is almost zero at the time of switching. A capacitor 52 (hereinafter may be referred to as parallel capacitor 52) is connected to each of switching elements Q1A to Q4A and Q1B to Q4B, if necessary.

Second positive electrode wire 21 and second negative electrode wire 22 are electrically connected to the positive electrode and the negative electrode of battery PS2. The midpoint of third bridge circuit 43 and the midpoint of fourth bridge circuit 44 are respectively electrically connected to both terminals of second winding 3b. Second converter 20 performs DC/AC bidirectional power conversion between battery PS2 and second winding 3b of transformer 3 through on/off control of switching elements Q1A, Q1B, Q2A, and Q2B.

On the first converter 10 side, first reactor 14 is connected in series in a connection path between first converter 10 and first winding 3a. In the present embodiment, first reactor 14 is connected in series in a connection path between the midpoint of first bridge circuit 41 and a first terminal of first winding 3a. Furthermore, first converter 10 further includes a first smoothing capacitor 13 connected in parallel to DC power source PS1 between first positive electrode wire 11 and first negative electrode wire 12.

On the second converter 20 side, second reactor 24 is connected in series in a connection path between second converter 20 and second winding 3b. In the present embodiment, second reactor 24 is connected in series in a connection path between the midpoint of third bridge circuit 43 and a first terminal of second winding 3b. Furthermore, second converter 20 further includes a second smoothing capacitor 23 connected in parallel to battery PS2 between second positive electrode wire 21 and second negative electrode wire 22. With first reactor 14 and second reactor 24, in DC/DC converter 100, inductance elements for excitation described later can be provided on a path including first converter 10 and first winding 3a and on a path including second converter 20 and second winding 3b. The arrangement of first reactor 14 and second reactor 24 is not essential, and the inductance element may be configured with leakage inductance of first winding 3a and second winding 3b.

However, if a reactor element is configured only with leakage inductance, adjustment of an inductance value is difficult. Moreover, increasing leakage inductance for adjustment of the inductance value may reduce the conversion efficiency in transformer 3. Therefore, external first reactor 14 and second reactor 24 may be arranged as necessary, so that the inductance value of the inductance element can be appropriately ensured without excessively increasing leakage inductance, thereby improving control stability and efficiency. Alternatively, an external reactor may be provided only on the primary side or the secondary side of transformer 3, that is, only one of first reactor 14 and second reactor 24 may be arranged.

A reactor 25 is connected in series to second positive electrode wire 21 between second smoothing capacitor 23 and battery PS2. Reactor 25 is provided with a not-shown current sensor for detecting charge/discharge current i (hereinafter simply referred to as "current i") of battery PS2. The current sensor may be provided on the side closer to second converter 20 than second smoothing capacitor 23. Current i is positive in the direction of arrow in FIG. 1. Therefore, current i is positive (i>0) at the time of discharge of battery PS2 and conversely, current i is negative (i<0) at the time of charge of battery PS2.

Furthermore, a voltage sensor (not shown) that detects terminal-to-terminal voltage of first smoothing capacitor 13 is provided in order to detect an output voltage v output from first converter 10 to DC power source PS1. Output signals of the current sensor and the voltage sensor are input to control circuit 30. Control circuit 30 can detect current i of battery PS2 and output voltage v of first converter 10, based on output signals from the current sensor and the voltage sensor.

Control circuit 30 includes a processing circuit to perform on/off drive control of each switching element. The processing circuit may be configured with an arithmetic processing device and a digital electronic circuit such as a storage device, may be configured with an analog electronic circuit such as a comparator, an operational amplifier, and a differential amplifier circuit, or may be configured with both of a digital electronic circuit and an analog electronic circuit.

Control circuit 30 generates a drive signal 31a for on/off drive control of each switching element Q3A, Q3B, Q4A, and Q4B of first converter 10 and a drive signal 31b for on/off drive control of each switching element Q1A, Q1B, Q2A, Q2B of second converter 20, based on the power transmission amount between DC power source PS1 and battery PS2.

In control circuit 30, an output DUTY ratio can be used as an intermediate variable representing the transmission power amount, in the same manner as in PTL 1. As will be described in detail later, control circuit 30 calculates the output DUTY ratio based on a command value for the transmission power amount and generates drive signals 31a and 31b for on/off drive control of each switching element in first converter 10 and second converter 20 based on the calculated output DUTY ratio. In doing so, control circuit 30 changes the output DUTY ratio that is an intermediate variable by feedback control described later such that the actual transmission power amount approaches the command value.

(Reference Element and Diagonal Element in DC/DC Converter)

Control circuit 30 sets one of the switching elements on the positive electrode side and the negative electrode side as a first reference element QB1 in first bridge circuit 41 and sets the switching element on the electrode side opposite to the first reference element in second bridge circuit 42 as a first diagonal element QO1 to control first converter 10. In the present embodiment, first switching element Q4A on the positive electrode side of first bridge circuit 41 is set as first reference element QB1, and in second bridge circuit 42, second switching element Q3B on the negative electrode side that is the opposite electrode to first reference element QB1 (positive electrode side) is set as first diagonal element QO1.

Alternatively, conversely, the bridge circuit of first converter 10 in which first reference element QB1 is set may be defined as first bridge circuit 41, and the bridge circuit of first converter 10 in which first diagonal element QO1 is set may be defined as second bridge circuit 42. In other words, one of switching elements Q3A and Q3B may be set as first reference element QB1, and one of switching elements Q4A and Q4B (the electrode side opposite to the first reference element) may be set as first diagonal element QO1.

Similarly, control circuit 30 sets one of the switching elements on the positive electrode side and the negative electrode side in third bridge circuit 43 as a second reference element QB2 and sets the switching element on the electrode side opposite to the second reference element in fourth bridge circuit 44 as a second diagonal element QO2 to control second converter 20. In the present embodiment, in third bridge circuit 43, third switching element Q1A on the same positive electrode side as in first bridge circuit 41 is set as second reference element QB2. In fourth bridge circuit 44, fourth switching element Q2B on the negative electrode side that is the opposite electrode to second reference element QB2 set as the positive electrode side is set as second diagonal element QO2.

Alternatively, also in second converter 20, the bridge circuit in second converter 20 in which second reference element QB2 is set may be defined as third bridge circuit 43, and the bridge circuit of second converter 20 in which second diagonal element QO2 is set may be defined as fourth bridge circuit 44. In other words, one of switching elements Q2A and Q2B may be set as second reference element QB2, and one of switching elements Q1A and Q1B (the electrode side opposite to the second reference element) may be set as second diagonal element QO2.

(Basic Control Behavior of First Power Transmission)

In DC/DC converter 100, first power transmission in which electric power is transmitted from DC power source PS1 to battery PS2, that is, battery PS2 is charged, and second power transmission in which electric power is transmitted from battery PS2 to DC power source PS1, that is, battery PS2 is discharged, are selectively performed. First, the circuit operation of first power transmission will be described.

The first power transmission includes charge of battery PS2 not involving step-up operation of second reactor 24 (which hereinafter may be referred to as step-down charge) and charge of battery PS2 involving step-up operation of second reactor 24 (which may be referred to as step-up charge).

Figure 2:
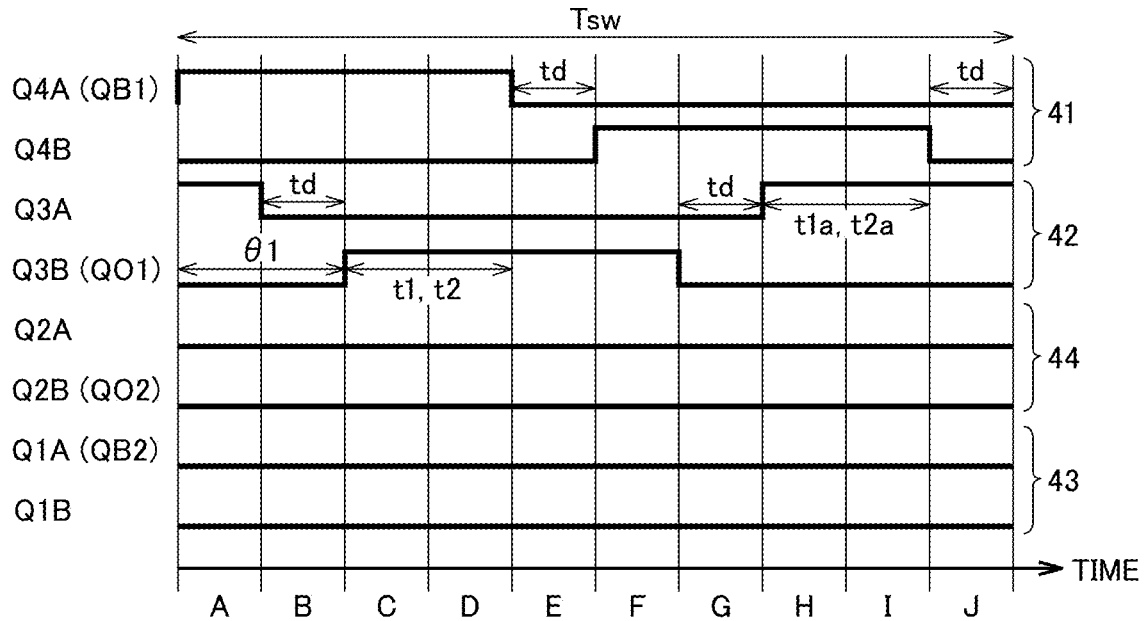
FIG. 2 is a time chart illustrating waveforms of on/off drive signals of switching elements in step-down charge of the DC/DC converter according to the first embodiment.
Figure 3:
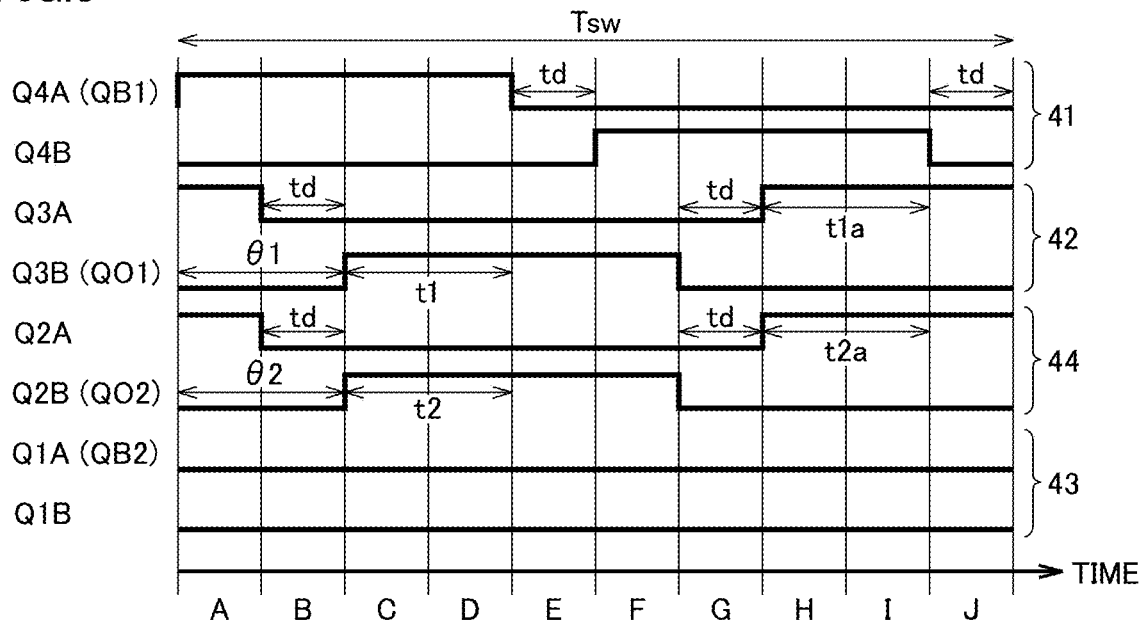
FIG. 3 is a time chart illustrating waveforms of on/off drive signals of switching elements in step-down charge in PTL 1 illustrated as a comparative example.

FIG. 2 shows a time chart illustrating waveforms of on/off drive signals of the switching elements in step-down charge of DC/DC converter 100 according to the first embodiment. In comparison, FIG. 3 is a time chart illustrating waveforms of on/off drive signals of the switching elements in step-down charge in PTL 1 illustrated as a comparative example. Furthermore, FIG. 4 shows a time chart illustrating waveforms of on/off drive signals of the switching elements in step-up charge of DC/DC converter 100 according to the first embodiment.

Figure 4:
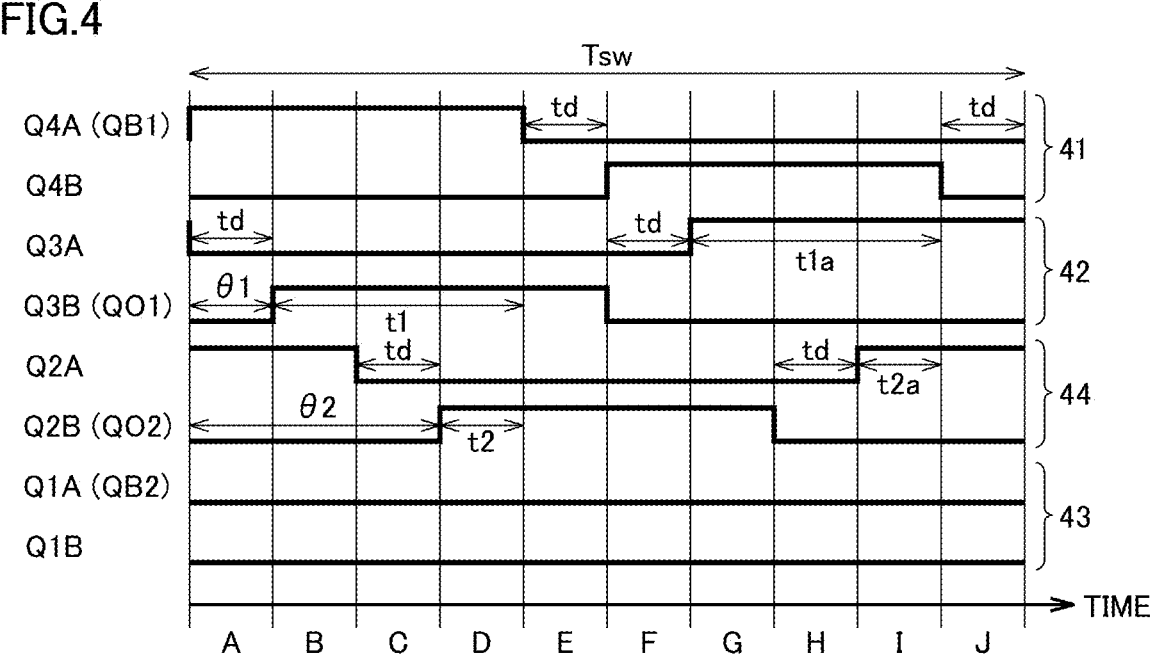
FIG. 4 is a time chart illustrating waveforms of on/off drive signals of switching elements in step-up charge of the DC/DC converter according to the first embodiment.

FIG. 2 to FIG. 4 show waveform examples for explaining the principle of step-down charge and step-up charge and strictly speaking do not agree with the control of a first phase shift amount θ1 and a second phase shift amount θ2 explained later with reference to FIG. 14 and the like. More specifically, in FIG. 2 to FIG. 4, for simplicity of explanation, a switching period Tsw of first bridge circuit 41 is divided into ten periods of periods A to J, and in each of periods A to J, a gate pattern that is a combination pattern of on or off drive signals of switching elements Q1A to Q4A and Q1B to Q4B is set.

Referring to FIG. 2, in the step-down charge operation that is the first power transmission not involving step-up operation, control circuit 30 alternatively turns on switching elements Q3A, Q3B, Q4A, and Q4B on the positive electrode side and the negative electrode side in first bridge circuit 41 and second bridge circuit 42, once for each, at equal intervals in a preset switching period Tsw. On the other hand, in the step-down charge operation, control circuit 30 keeps off third switching elements Q1A and Q1B on the positive electrode side and the negative electrode side of third bridge circuit 43 and fourth switching elements Q2A and Q2B on the positive electrode side and the negative electrode side of fourth bridge circuit 44. In the following, the above-noted operation in which the switching elements on the positive electrode side and the negative electrode side in both of third bridge circuit 43 and fourth bridge circuit 44 are kept in the off state may be referred to as "two-leg off operation".

In the present embodiment, control circuit 30 is configured such that the switching elements on the positive electrode side and the negative electrode side are alternately turned on at equal intervals with a short-circuit prevention time td interposed. In other words, the switching elements on the positive electrode side and the negative electrode side are each controlled at a 50% on-time ratio excluding the short-circuit prevention time td. The short-circuit prevention time td is a time period (called dead time) set for preventing simultaneous turning-on of the switching elements on the positive electrode side and the negative electrode side, and both of the switching elements on the positive electrode side and the negative electrode side are brought to the off state during the short-circuit prevention time td.

Specifically, for first bridge circuit 41, control circuit 30 turns on a drive signal to correspond to the ON period of first switching element Q4A on the positive electrode side and turns on a drive signal of first switching element Q4B on the negative electrode side after the lapse of the short-circuit prevention time td since turning-off of first switching element Q4A. The drive signal is turned on to correspond to the ON period of first switching element Q4B. After the elapse of the short-circuit prevention time td since turning-off of first switching element Q4B, a drive signal of first switching element Q4A on the positive electrode side is turned on again.

The short-circuit prevention time td is preset to correspond to the time required for the voltage at parallel capacitor 52 of each switching element to increase to the voltage at first smoothing capacitor 13 or the time required for the voltage at parallel capacitor 52 to decrease to the vicinity of zero voltage, when each switching element of first converter 10 is turned on. As a result, the ON time Ton of each switching element is denoted by Ton=(Tsw−2×td)/2 using the switching period Tsw and the short-circuit prevention time td.

In the case of the step-down charge operation in FIG. 2, control circuit 30 controls, as a first phase shift amount θ1, the phase shift amount of the on/off drive signal of first diagonal element QO1 (second switching element Q3B on the negative electrode side) with respect to the on/off drive signal of first reference element QB1 (first switching element Q4A on the positive electrode side). Control circuit 30 changes the first phase shift amount θ1 based on the transmission power amount (in the present example, output DUTY ratio).

On the other hand, as described above, the two-leg off operation is applied in step-down charge. Therefore, a second phase shift amount θ2 is not set, which is the phase shift amount of the on/off drive signal of second diagonal element QO2 (fourth switching element Q2B on the negative electrode side) with respect to the on/off drive signal of first reference element QB1 (first switching element Q4A on the positive electrode side).

In comparison, as shown in FIG. 3, second converter 20 can be controlled, if necessary, in accordance with the second phase shift amount θ2 virtually set so as to make a change in the same amount as in the first phase shift amount θ1. The first phase shift amount θ1 and the second phase shift amount θ2 are phase shift amounts in the advance direction. In step-down discharge in PTL 1, in a DC/DC converter similar to that in FIG. 1, the on/off of switching elements Q1A to Q4A and Q1B to Q4B is controlled in accordance with the gate patterns in FIG. 3.

Referring to FIG. 3, in the step-down charge operation in PTL 1, for switching elements Q3A, Q3B, Q4A, and Q4B in first converter 10 turned on/off in the same manner as in FIG. 2, fourth switching elements Q2A and Q2B of fourth bridge circuit 44 in second converter 20 are turned on/off in synchronization with second switching elements Q3A and Q3B in first converter 10 in accordance with the virtually set second phase shift amount θ2 (θ2=θ1).

On the other hand, in second converter 20, third switching elements Q1A and Q1B of third bridge circuit 43 are kept off in the same manner as in FIG. 2. In the following, the above-noted operation in which the switching elements on the positive electrode side and the negative electrode side are brought to the off state in only one of third bridge circuit 43 and fourth bridge circuit 44 may be referred to as "one-leg off operation".

In this way, the present first embodiment and PTL 1 differ in control of the switching elements (more specifically, fourth switching elements Q2A and Q2B) of second converter 20 in step-down discharge.

In the step-up charge operation in FIG. 4, control circuit 30 sets the phase shift amount of the on/off drive signal of first diagonal element QO1 (second switching element Q3B on the negative electrode side) with respect to the on/off drive signal of first reference element QB1 (first switching element Q4A on the positive electrode side), as the first phase shift amount θ1, and sets the phase shift amount of the on/off drive signal of second diagonal element QO2 (fourth switching element Q2B on the negative electrode side) with respect to the on/off drive signal of first reference element QB1, as the second phase shift amount θ2, to perform control.

Control circuit 30 changes the first phase shift amount θ1 and the second phase shift amount θ2, based on the transmission power amount (in the present example, output DUTY ratio). In FIG. 4 also, the first phase shift amount θ1 and the second phase shift amount θ2 are phase shift amounts in the advance direction. In the case of the step-up charge operation in FIG. 4, the second phase shift amount θ2 is a value greater than the first phase shift amount θ1.

Here, referring to FIG. 2 and FIG. 4, the operation at the time of charge of battery PS2 will be described in detail.

When a period in which first reference element QB1 (first switching element Q4A on the positive electrode side) and first diagonal element QO1 (second switching element Q3B on the negative electrode side) are simultaneously on in step-down charge (FIG. 2) and step-up charge (FIG. 4) is defined as a first diagonal ON time t1, the first diagonal ON time t1 changes in accordance with the first phase shift amount θ1. Furthermore, the period in which first switching element Q4B on the negative electrode side and second switching element Q3A on the positive electrode side are simultaneously on (which may be referred to as first diagonal ON time t1a) is equal to the first diagonal ON time t1.

In the step-down discharge in FIG. 2, switching elements Q1A and Q1B (third bridge circuit 43) and switching elements Q2A and Q2B (fourth bridge circuit 44) kept in the off state in FIG. 2 may be virtually turned on/off. In the present embodiment, "virtual on/off" means a state in which the on/off drive signal of the switching element (off state) that is actually not turned on/off is generated in the inside of control circuit 30 but actually not output to the gate of the switching element.

Specifically, the on/off drive signals of switching elements Q4A and Q4B of first bridge circuit 41 can be set as the virtual on/off drive signals of switching elements Q1A and Q1B in third bridge circuit 43, if necessary. Similarly, the on/off drive signals of switching elements Q3A and Q3B of second bridge circuit 42 can be set as the virtual on/off drive signals of switching elements Q2A and Q2B of fourth bridge circuit 44, if necessary.

In this case, when a period in which the virtual on/off drive signal of second reference element QB2 (third switching element Q1A on the positive electrode side) and the virtual on/off drive signal of second diagonal element QO2 (fourth switching element Q2B on the negative electrode side) are simultaneously on is set as a second virtual diagonal ON time t2, the second virtual diagonal ON time t2 changes in accordance with the virtually set second phase shift amount θ2. Furthermore, the second virtual diagonal ON time t2a in which the virtual on/off drive signal of third switching element Q1B on the negative electrode side and the virtual on/off drive signal of fourth switching element Q2A on the positive electrode side are simultaneously on is also equal to the second virtual diagonal ON time t2.

Furthermore, in the step-up charge in FIG. 4, the on/off drive signals of first switching elements Q4A and Q4B of first bridge circuit 41 can be set as the virtual on/off drive signals of third switching elements Q1A and Q1B of third bridge circuit 43.

Then, when a period in which the virtual on/off drive signal of second reference element QB2 (third switching element Q1A on the positive electrode side) and the on/off drive signal of second diagonal element QO2 (fourth switching element Q2B on the negative electrode side) are simultaneously on is set as the second virtual diagonal ON time t2, the second virtual diagonal ON time t2 changes in accordance with the second phase shift amount θ2. Furthermore, the second virtual diagonal ON time t2a in which the virtual on/off drive signal of third switching element Q1B on the negative electrode side and the on/off drive signal of fourth switching element Q2A on the positive electrode side are simultaneously on is also equal to the second virtual diagonal ON time t2.

The circuit operation of DC/DC converter (battery charging/discharging device) 100 in step-up charge is similar to that of PTL 1 and the current path corresponding to each gate pattern shown in FIG. 4 is described also in PTL 1 above. Here, charge (step-up charge) of battery PS2 involving the step-up operation of second reactor 24 will be described by describing the current path in period B and period C in FIG. 4.

Figure 5:
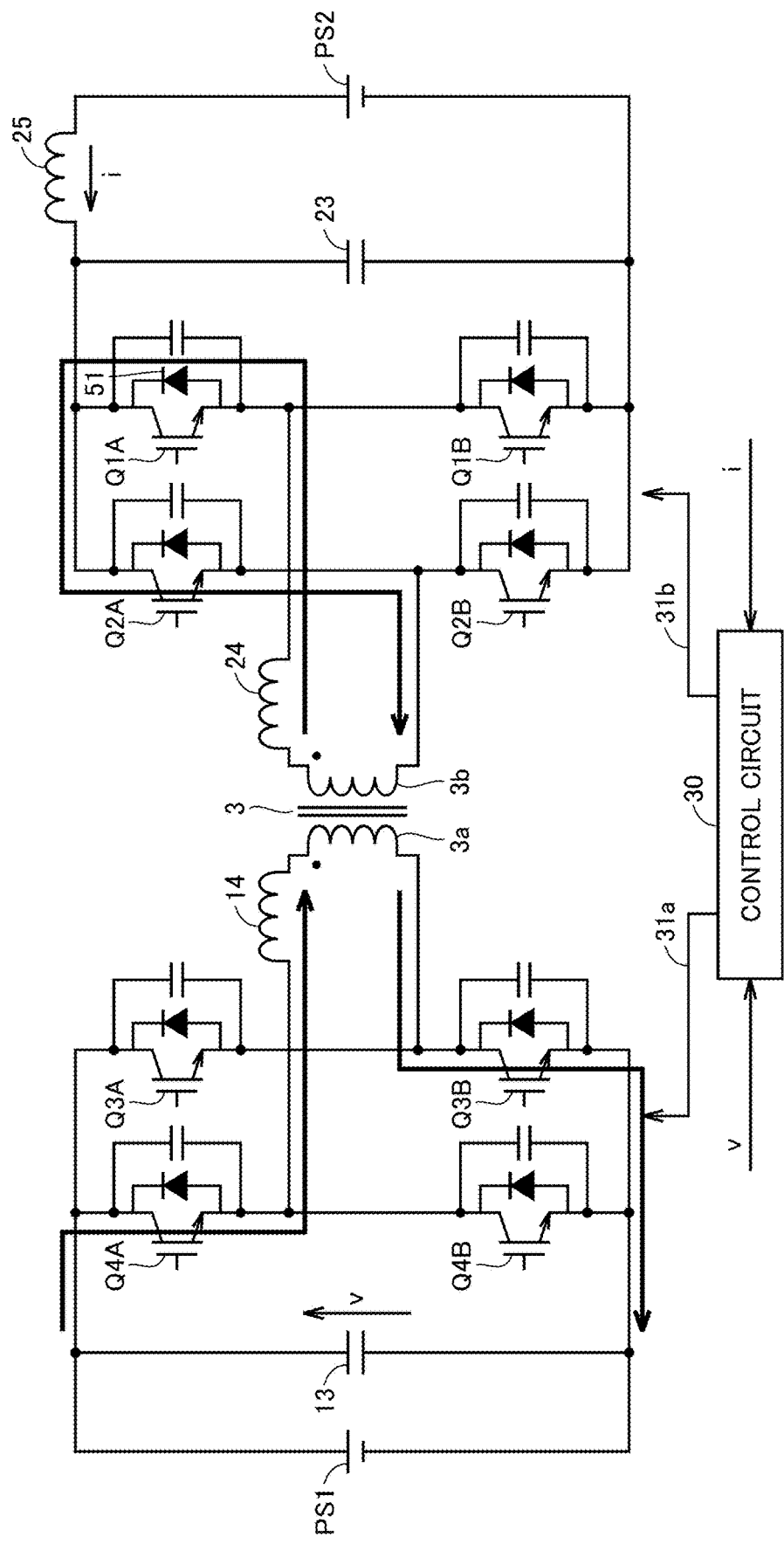
FIG. 5 is a first circuit diagram for explaining a current path in step-up charge operation according to FIG. 4.

FIG. 5 shows a current path corresponding to the gate pattern in period B in FIG. 4.

Referring to FIG. 5, in period B in FIG. 4, first switching element Q4A on the positive electrode side (first reference element QB1) and second switching element Q3B on the negative electrode side (first diagonal element QO1) are simultaneously on in first converter 10, and the diagonal two elements become electrically continuous. Therefore, current through first switching element Q4A on the positive electrode side and second switching element Q3B on the negative electrode side allows energy to be transmitted from the DC power source PS1 to first reactor 14 to excite first reactor 14.

In period B, fourth switching element Q2A on the positive electrode side is turned on in second converter 20. Therefore, current circulates through fourth switching element Q2A on the positive electrode side and antiparallel diode 51 of third switching element Q1A on the positive electrode side to second reactor 24. This current excites second reactor 24. As a result, in period B, first reactor 14 and second reactor 24 are excited. In the present embodiment, this excitation operation is referred to as step-up.

Figure 6:
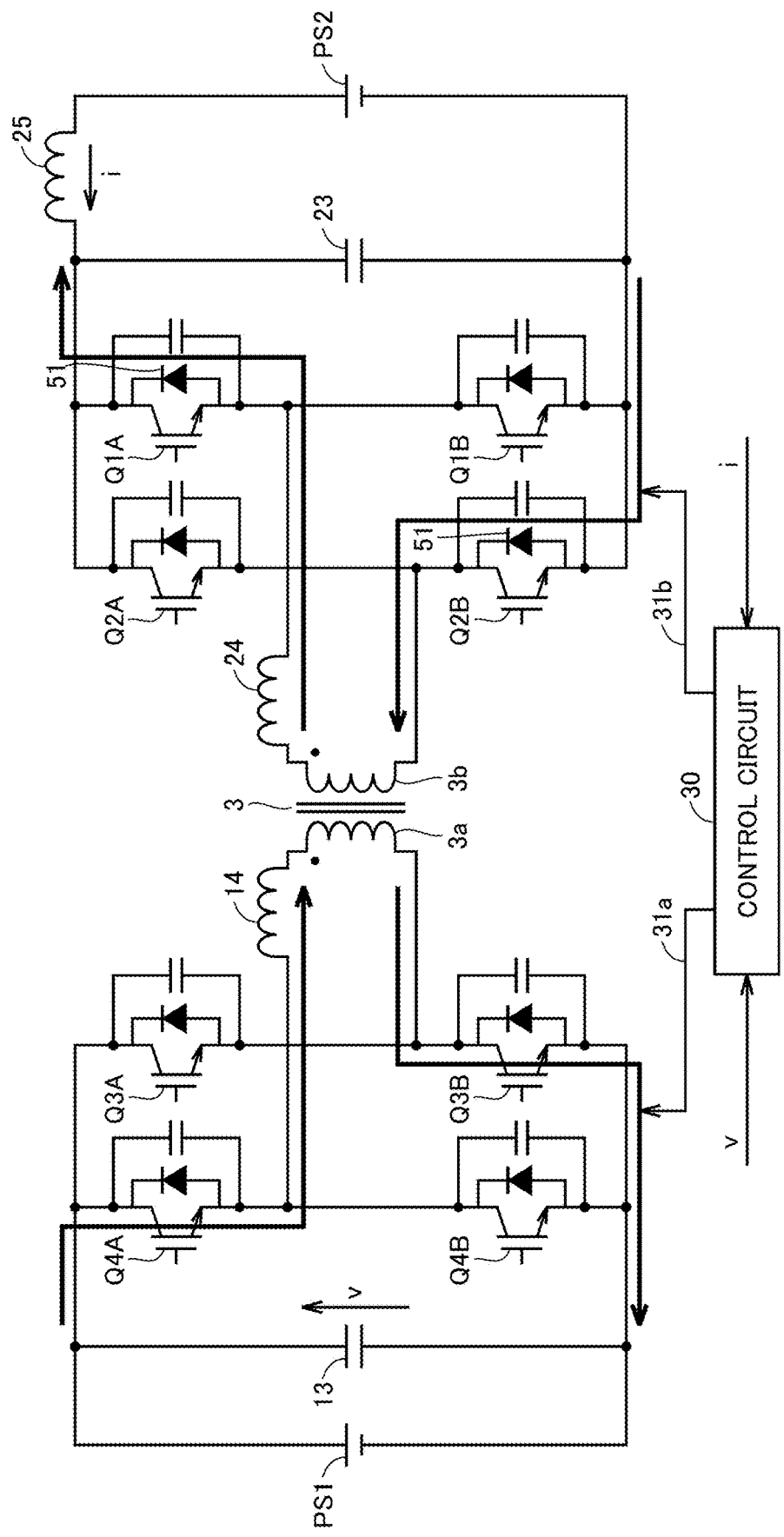
FIG. 6 is a second circuit diagram for explaining a current path in step-up charge operation according to FIG. 4.

FIG. 6 shows a current path corresponding to the gate pattern in period C in FIG. 4.

Referring to FIG. 6, in period C in FIG. 4 in the same manner as period B, first switching element Q4A on the positive electrode side (first reference element QB1) and second switching element Q3B on the negative electrode side (first diagonal element QO1) are simultaneously turned on in first converter 10, thereby exciting first reactor 14.

On the other hand, in period C, fourth switching element Q2A on the positive electrode side is turned off in second converter 20, and current flows toward battery PS2 through antiparallel diode 51 of third switching element Q1A on the positive electrode side and antiparallel diode 51 of fourth switching element Q2B on the negative electrode side.

Accordingly, in period C, excitation energy of first reactor 14 and second reactor 24 is transmitted toward battery PS2. Charge of battery PS2 (step-up charge) involving step-up operation of second reactor 24 is thus carried out.

The circuit operation of step-down charge will now be described in further detail.

Figure 7:
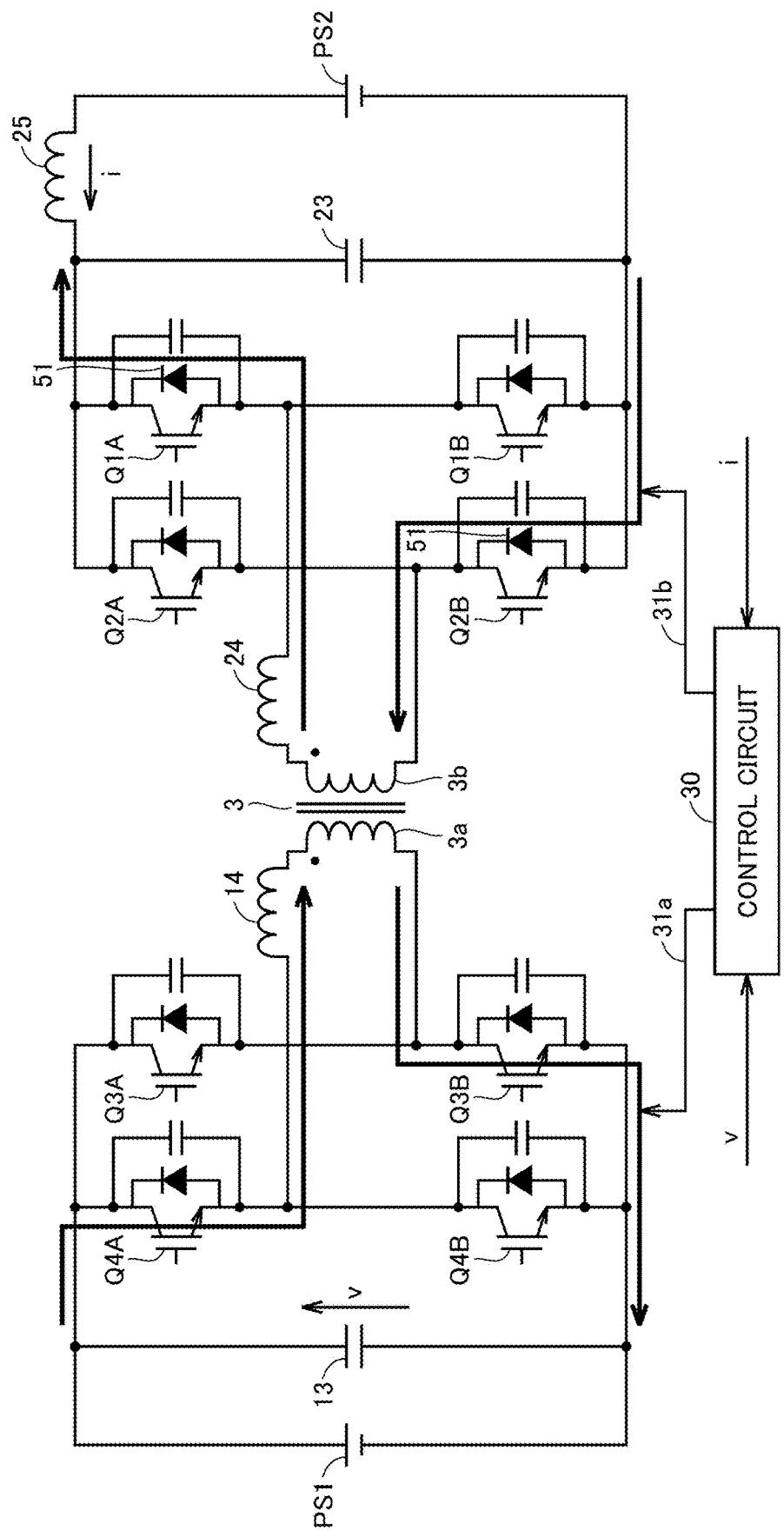
FIG. 7 is a first circuit diagram for explaining a current path in step-down charge operation according to FIG. 2.

FIG. 7 shows a current path corresponding to the gate pattern in period C in FIG. 2.

Referring to FIG. 7, in period C in FIG. 2, since first switching element Q4A on the positive electrode side (first reference element QB1) and second switching element Q3B on the negative electrode side (first diagonal element QO1) are simultaneously turned on in first converter 10, energy is transmitted from DC power source PS1 to first reactor 14 thereby exciting first reactor 14.

On the other hand, in period C, in second converter 20 in which the two-leg off operation is applied, a current path for charging battery PS2 is formed through antiparallel diode 51 of third switching element Q1A on the positive electrode side (off) and antiparallel diode 51 of fourth switching element Q2B on the negative electrode side (off). In FIG. 7, a current path similar to that in FIG. 6 is formed but second reactor 24 is not excited in the preceding period as will be described later.

Since a gate pattern similar to that in period C is applied in period D in FIG. 2, a current path is also formed in the same manner as in FIG. 6.

Subsequently, in period E in FIG. 2, first switching element Q4A on the positive electrode side is turned off in first converter 10.

Figure 8:
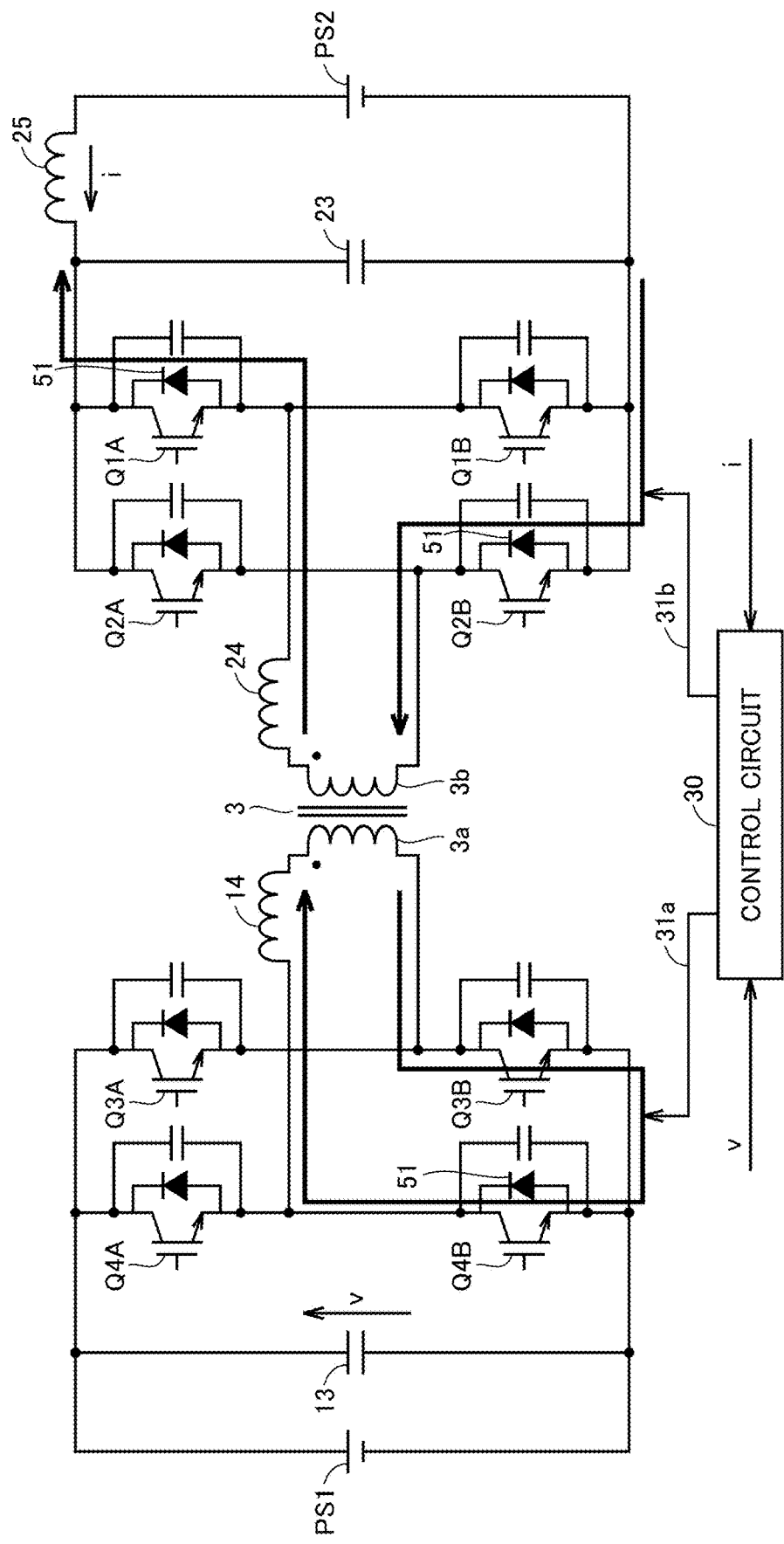
FIG. 8 is a second circuit diagram for explaining a current path in step-down charge operation according to FIG. 2.

FIG. 8 shows a current path corresponding to the gate pattern in period E in FIG. 2.

Referring to FIG. 8, with turning-off of switching element Q4A, current in first converter 10 passes through a current path, not via DC power source PS1, through antiparallel diode 51 of first switching element Q4B on the negative electrode side and second switching element Q3B on the negative electrode side. At this moment, output voltage from DC power source PS1 is not applied to first winding 3a of transformer 3. On the other hand, in second converter 20 in which the two-leg off operation is applied, a current path via the antiparallel diodes of switching element Q1A and switching element Q2B in the off state is formed. As a result, energy of the excited first reactor 14 is transmitted toward battery PS2 via transformer 3.

When the circuit state in FIG. 8 continues, current flowing toward battery PS2 gradually decreases through the current path including antiparallel diodes 51 of switching element Q1A (off) and switching element Q2B (off) in second converter 20.

Figure 9:
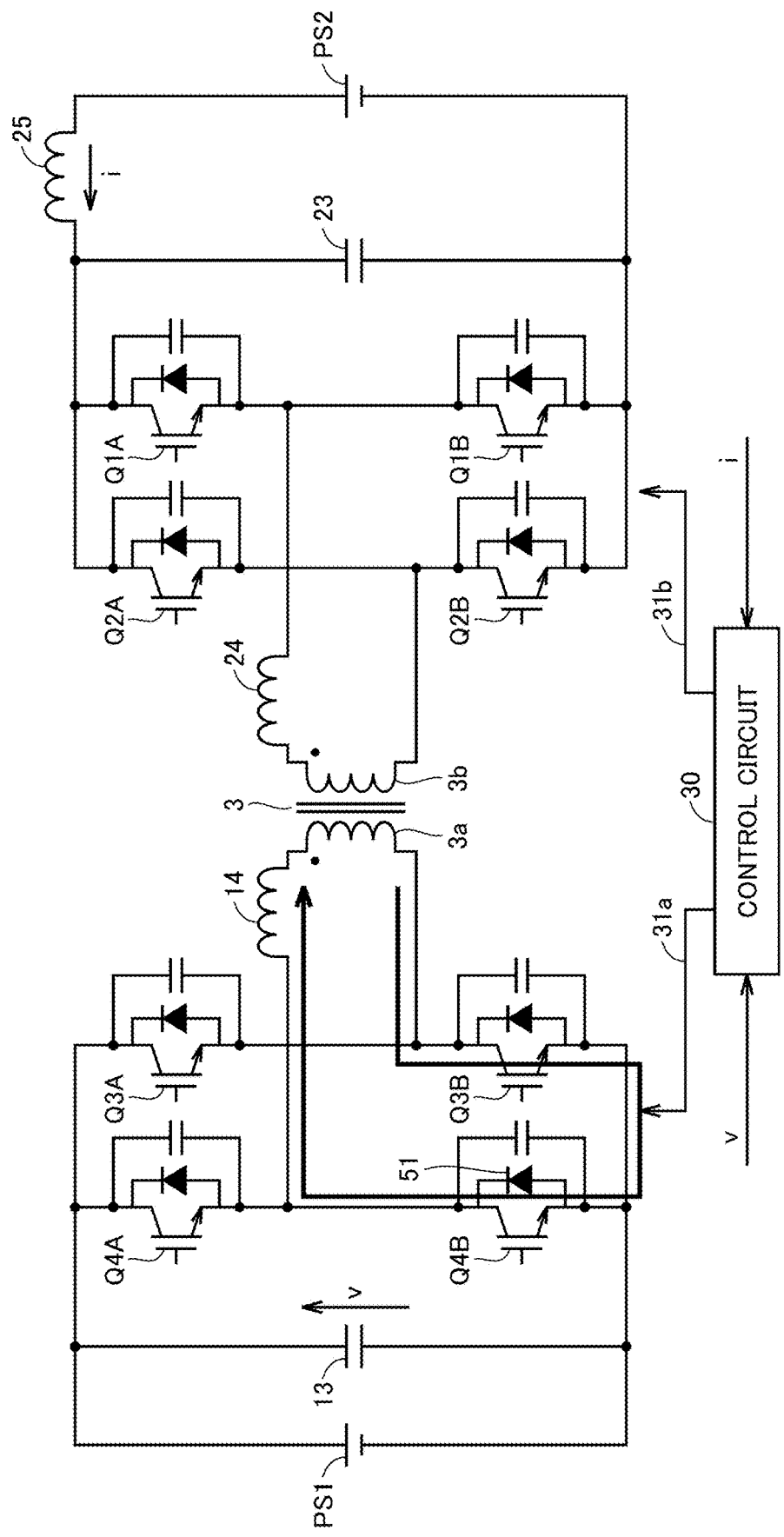
FIG. 9 is a third circuit diagram for explaining a current path in step-down charge operation according to FIG. 2.

Then, as shown in FIG. 9, second converter 20 reaches a state in which current disappears. The circuit state in FIG. 9 is kept in periods F and G until period H in which the diagonal two elements (here, switching element Q3A and switching element Q4B) in first converter 10 are turned on again.

Figure 10:
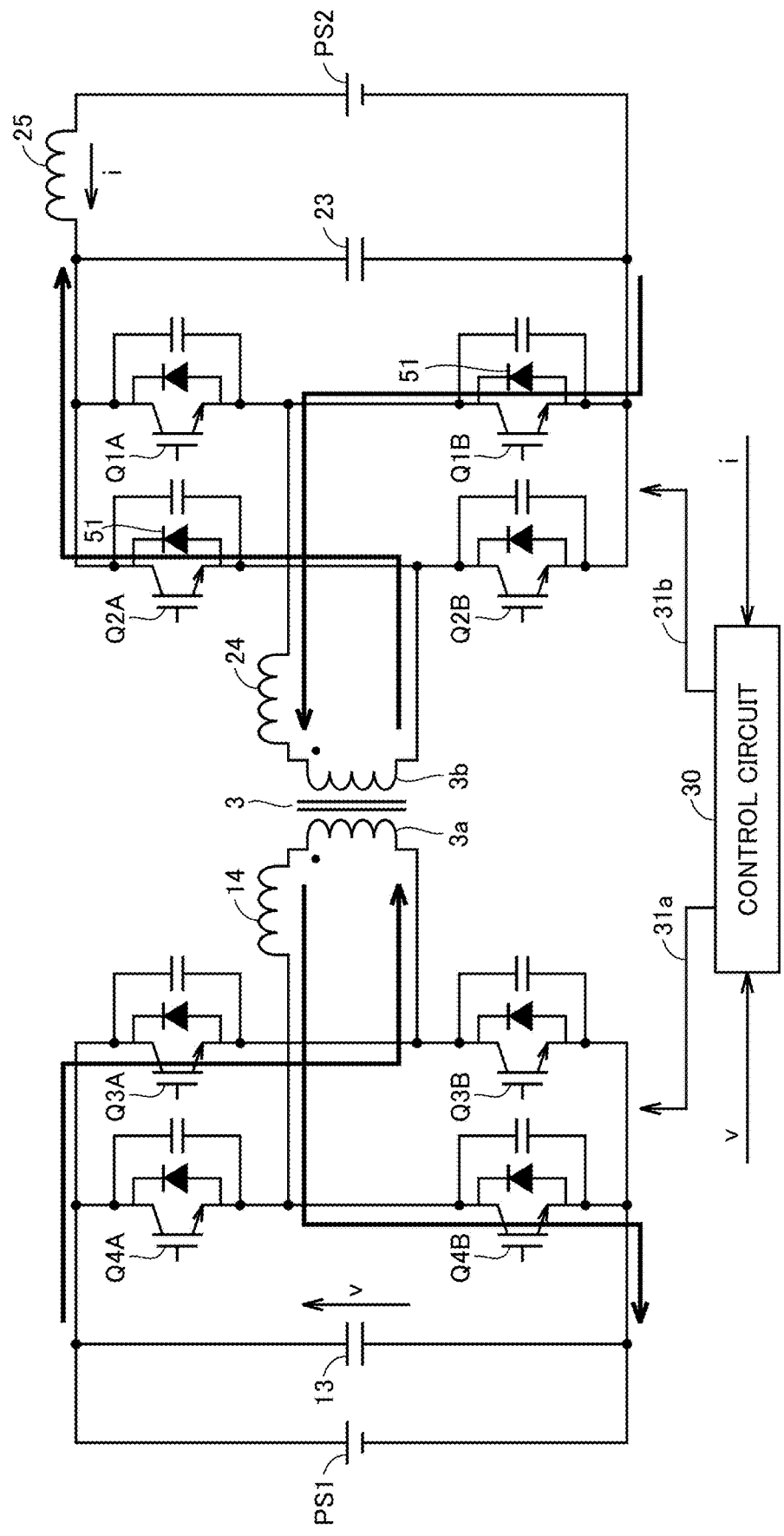
FIG. 10 is a fourth circuit diagram for explaining a current path in step-down charge operation according to FIG. 2.

FIG. 10 shows a current path corresponding to the gate pattern in period H in FIG. 2.

Referring to FIG. 10, in period H, since second switching element Q3A on the positive electrode side is turned on, first reactor 14 is excited again by current through a path including second switching element Q3A on the positive electrode side and first switching element Q4B on the negative electrode side. After period H, the operation with a current direction opposite to that in periods C to G is repeated in first converter 10 and second converter 20, and the circuit operation will not be further elaborated.

In this way, it can be understood that in the step-down charge operation in FIG. 2, battery PS2 is charged without involving the step-up operation of second reactor 24.

(Basic Control Behavior of Second Power Transmission)

Next, the circuit operation of second power transmission in which power is transmitted from battery PS2 to DC power source PS1, that is, battery PS2 is discharged will be described. The second power transmission also includes discharge of battery PS2 not involving step-up operation of first reactor 14 (which hereinafter may be referred to as step-down discharge) and discharge of battery PS2 involving step-up operation of first reactor 14 (which may be referred to as step-up discharge).

Figure 11:
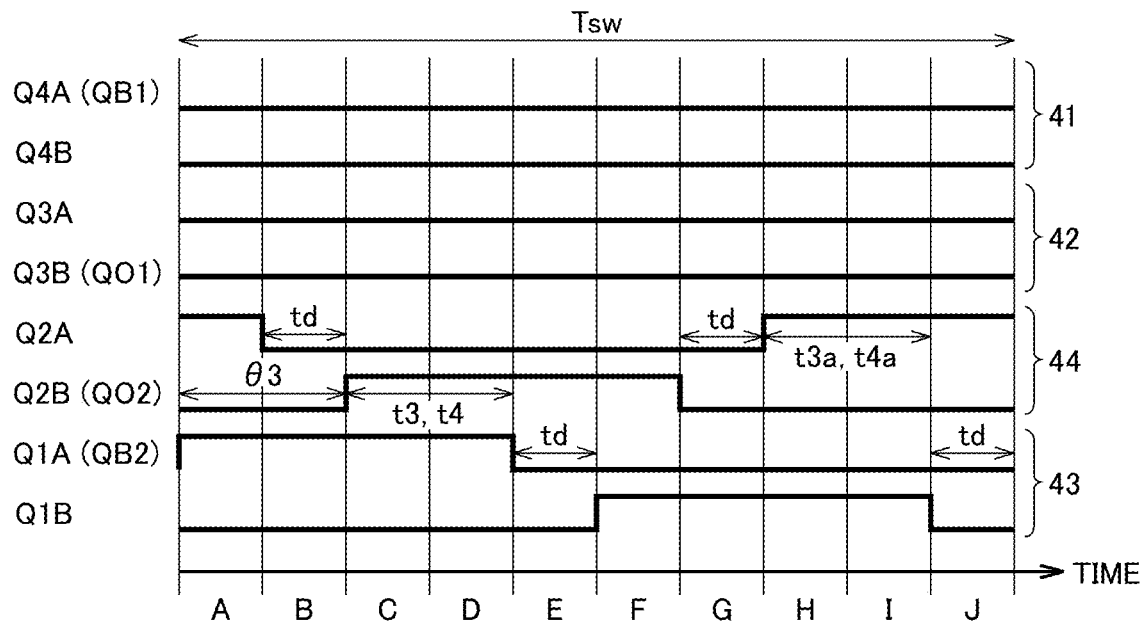
FIG. 11 is a time chart illustrating waveforms of on/off drive signals of switching elements in step-down discharge of the DC/DC converter according to the first embodiment.
Figure 12:
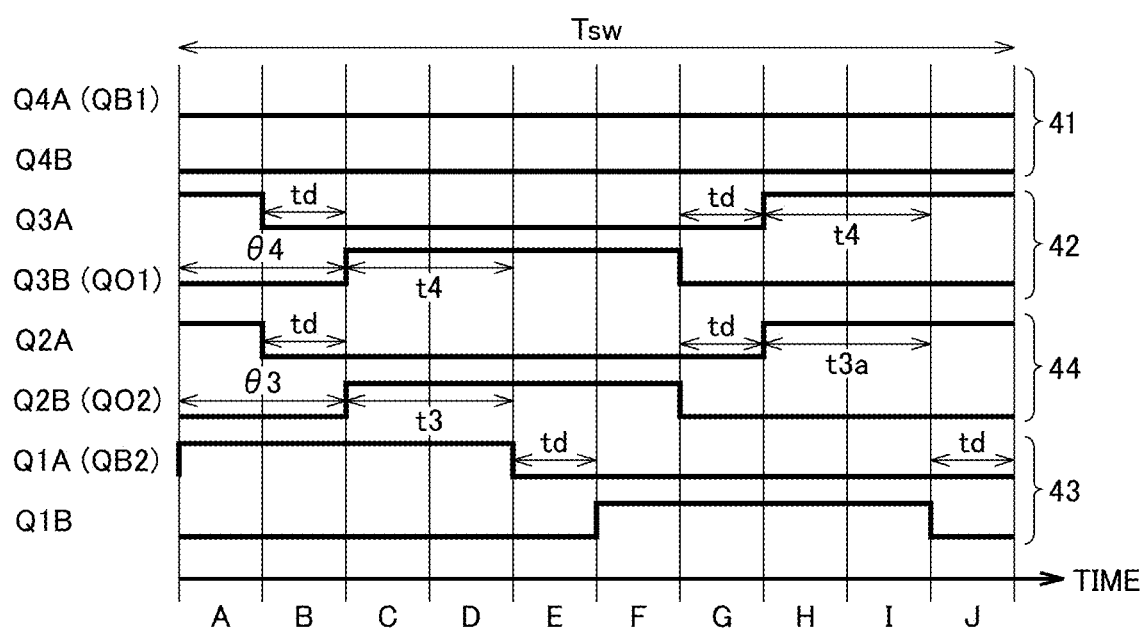
FIG. 12 is a time chart illustrating waveforms of on/off drive signals of switching elements in step-down discharge in PTL 1 illustrated as a comparative example.
Figure 13:
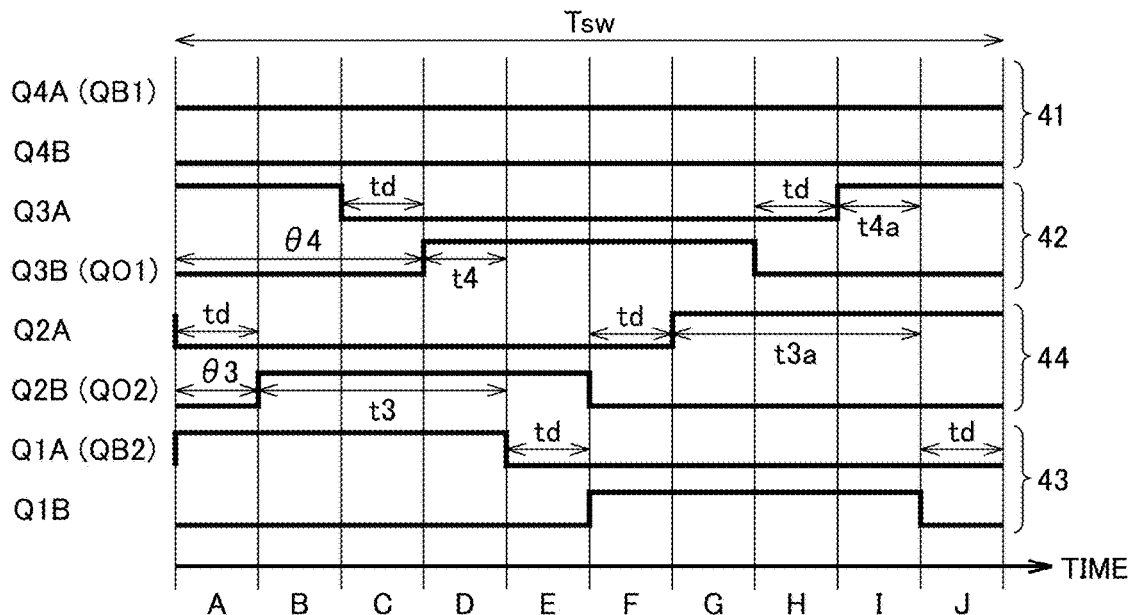
FIG. 13 is a time chart illustrating waveforms of on/off drive signals of switching elements in step-up discharge of the DC/DC converter according to the first embodiment.

FIG. 11 shows a time chart illustrating waveforms of on/off drive signals of the switching elements in step-down discharge of DC/DC converter 100 according to the first embodiment. In comparison, FIG. 12 shows a time chart illustrating waveforms of on/off drive signals of the switching elements in step-down discharge in PTL 1 illustrated as a comparative example. FIG. 13 shows a time chart illustrating waveforms of on/off drive signals of the switching elements in step-up discharge of DC/DC converter 100 according to the first embodiment.

FIG. 11 to FIG. 13 also show waveform examples for explaining the principle of step-down charge and step-up charge, which strictly speaking do not agree with the control of a third phase shift amount θ3 and a fourth phase shift amount θ4 explained later. More specifically, also in FIG. 11 to FIG. 13, for simplicity of explanation, switching period Tsw of third bridge circuit 43 is divided into ten periods, namely, periods A to J, and in each of periods A to J, a gate pattern that is a combination pattern of the on or off drive signals of the switching elements is set.

Referring to FIG. 11, in the step-down discharge operation that is the second power transmission not involving step-up operation, control circuit 30 alternatively turns on switching elements Q1A, Q1B, Q2A, and Q2B on the positive electrode side and the negative electrode side in third bridge circuit 43 and fourth bridge circuit 44, once for each, at equal intervals in a preset switching period Tsw. On the other hand, in the step-down discharge operation, control circuit 30 keeps off first switching elements Q4A and Q4B on the positive electrode side and the negative electrode side of first bridge circuit 41 and second switching elements Q3A and Q3B on the positive electrode side and the negative electrode side of second bridge circuit 42. In other words, the two-leg off operation is applied to first converter 10.

Even in the second power transmission, the short-circuit prevention time td is applied and the switching elements on the positive electrode side and the negative electrode side are alternately turned on at equal intervals in bridge circuits 41 to 44, in the same manner as the first power transmission (FIG. 2 to FIG. 4).

In the case of the step-down discharge operation in FIG. 11, control circuit 30 controls, as a third phase shift amount θ3, the phase shift amount of the on/off drive signal of second diagonal element QO2 (fourth switching element Q2B on the negative electrode side) with respect to the on/off drive signal of second reference element QB2 (third switching element Q1A on the positive electrode side). Control circuit 30 changes the third phase shift amount θ3 based on the transmission power amount (in the present example, output DUTY ratio).

When the two-leg off operation is applied, the fourth phase shift amount θ4 is not set, which is the phase shift amount of the on/off drive signal of first diagonal element Q01 (second switching element Q3B on the negative electrode side) with respect to the on/off drive signal of second reference element QB2 (third switching element Q1A on the positive electrode side).

Referring to FIG. 12, in the step-down discharge operation in PTL 1, a virtual phase shift amount is set in the same manner as described with reference to FIG. 3. Thus, for switching elements Q1A, Q1B, Q2A, and Q2B of second converter 20 that are turned on/off in the same manner as in FIG. 11, in first converter 10, second switching elements Q3A and Q3B of second bridge circuit 42 are turned on/off in synchronization with fourth switching elements Q2A and Q2B in second converter 20, in accordance with the virtually set fourth phase shift amount θ4 (θ4=θ3).

In second converter 20, switching elements Q4A and Q4B of first bridge circuit 41 are kept off in the same manner as in FIG. 11. In other words, the one-leg off operation is applied to second converter 20, in the same manner as first converter 10 in FIG. 3.

Referring to FIG. 13, in the step-up discharge operation, control circuit 30 controls, as the third phase shift amount θ3, the phase shift amount of the on/off drive signal of second diagonal element QO2 (fourth switching element Q2B on the negative electrode side) with respect to the on/off drive signal of second reference element QB2 (third switching element Q1A on the positive electrode side) and controls, as the fourth phase shift amount θ4, the phase shift amount of the on/off drive signal of first diagonal element QO1 (second switching element Q3B on the negative electrode side) with respect to the on/off drive signal of second reference element QB2.

Then, control circuit 30 changes the third phase shift amount θ3 and the fourth phase shift amount θ4, based on the transmission power amount (in the present example, output DUTY ratio). In FIG. 13, the third phase shift amount θ3 and the fourth phase shift amount θ4 are also phase shift amounts in the advance direction. In the case of the step-up discharge in FIG. 13, the fourth phase shift amount θ4 is a value greater than the third phase shift amount θ3.

Here, referring to FIG. 11 and FIG. 13, the operation at the time of discharge of battery PS2 will be described in detail. In the on/off drive signals of the switching elements at the time of step-down discharge shown in FIG. 11, the on/off drive signals of first switching elements Q4A and Q4B and the on/off drive signals of third switching elements Q1A and Q1B at the time of step-down charge shown in FIG. 2 are replaced with each other, and the on/off drive signals of second switching element Q3A and Q3B and the on/off drive signals of fourth switching elements Q2A and Q2B are replaced with each other.

Similarly, in the on/off drive signals of the switching elements at the time of step-up discharge shown in FIG. 13, the on/off drive signals of first switching elements Q4A and Q4B and the on/off drive signals of third switching elements Q1A and Q1B at the time of step-up charge shown in FIG. 4 are replaced with each other, and the on/off drive signals of second switching element Q3A and Q3B and the on/off drive signals of fourth switching elements Q2A and Q2B are replaced with each other.

As shown in FIG. 11 and FIG. 13, when a period in which second reference element QB2 (third switching element Q1A on the positive electrode side) and second diagonal element QO2 (fourth switching element Q2B on the negative electrode side) are simultaneously on is defined as a third diagonal ON time t3, the third diagonal ON time t3 changes in accordance with the third phase shift amount θ3. Furthermore, a period in which third switching element Q1B on the negative electrode side and fourth switching element Q2A on the positive electrode side are simultaneously on (which may be referred to as third diagonal ON time t3a) is equal to the third diagonal ON time t3.

Even in the step-down discharge in FIG. 11, switching elements Q4A and Q4B (first bridge circuit 41) and switching elements Q3A and Q3B (second bridge circuit 42) that are kept in the off state in FIG. 11 may be virtually turned on/off, if necessary. Specifically, the on/off drive signals of third switching elements Q1A and Q1B of third bridge circuit 43 can be set as virtual on/off drive signals of first switching elements Q4A and Q4B of first bridge circuit 41, if necessary. Similarly, the on/off drive signals of switching elements Q2A and Q2B of fourth bridge circuit 44 can be set as virtual on/off drive signals of switching elements Q3A and Q3B of second bridge circuit 42, if necessary.

In this case, when a period in which the virtual on/off drive signal of first reference element QB1 (first switching element Q4A on the positive electrode side) and the virtual on/off drive signal of first diagonal element QO1 (second switching element Q3B on the negative electrode side) are simultaneously on is set as a fourth virtual diagonal ON time t4, the fourth virtual diagonal ON time t4 changes in accordance with the virtually set fourth phase shift amount θ4. Furthermore, the fourth virtual diagonal ON time t4a in which the virtual on/off drive signal of first switching element Q4B on the negative electrode side and the virtual on/off drive signal of second switching element Q3A on the positive electrode side are simultaneously on is also equal to the fourth virtual diagonal ON time t4.

Furthermore, in the step-up discharge in FIG. 13, the on/off drive signals of third switching elements Q1A and Q1B of third bridge circuit 43 can be set as virtual on/off drive signals of first switching elements Q4A and Q4B of first bridge circuit 41.

Then, when a period in which the virtual on/off drive signal of first reference element QB1 (first switching element Q4A on the positive electrode side) and the on/off drive signal of first diagonal element QO1 (second switching element Q3B on the negative electrode side) are simultaneously on is set as a fourth virtual diagonal ON time t4, the fourth virtual diagonal ON time t4 changes in accordance with the fourth phase shift amount θ4. Furthermore, the fourth virtual diagonal ON time t4a in which the virtual on/off drive signal of first switching element Q4B on the negative electrode side and the on/off drive signal of second switching element Q3A on the positive electrode side are simultaneously on is also equal to the fourth virtual diagonal ON time t4.

Figure 14:
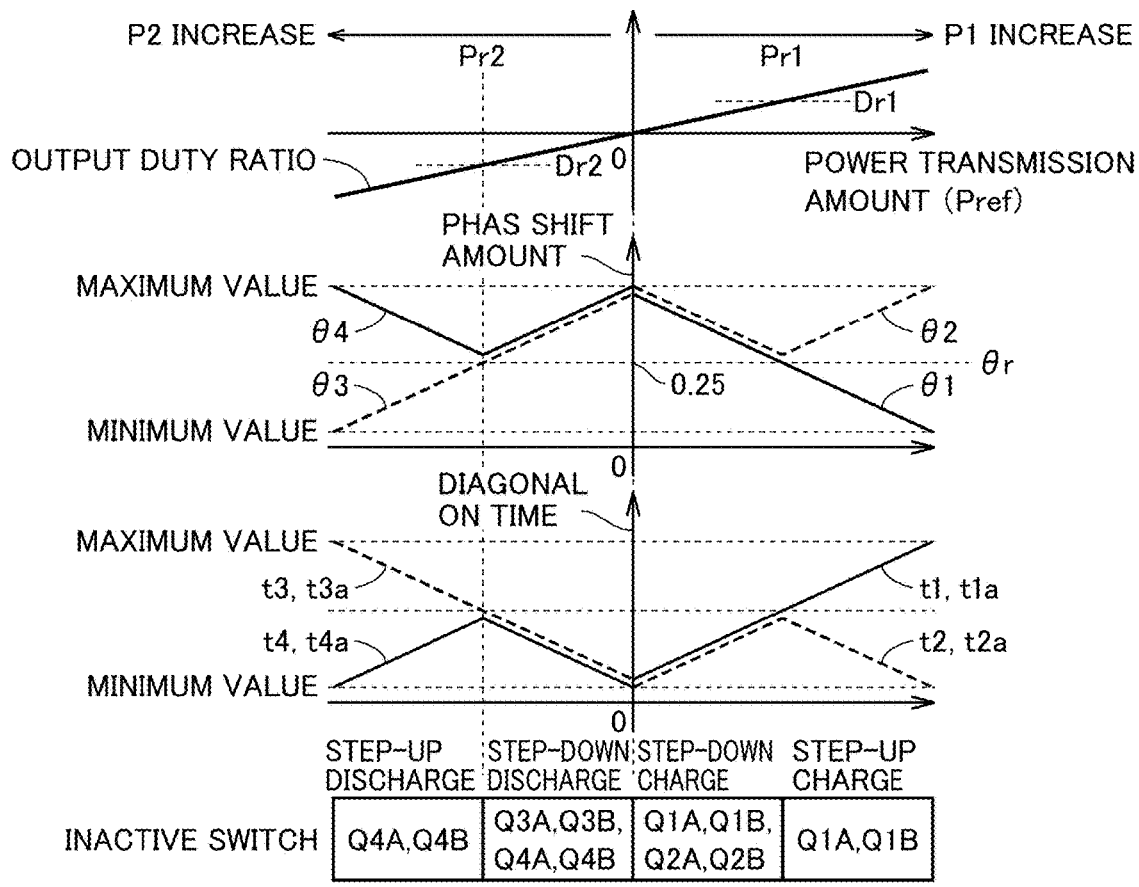
FIG. 14 is a graph for explaining control of a phase shift amount based on a power transmission amount in the DC/DC converter according to the first embodiment.

In the step-up discharge and the step-down discharge in which the gate patterns shown in FIG. 12 and FIG. 14 are applied, the circuit operations of first converter 10 and second converter 20 are replaced with each other for the step-up charge and the step-down charge illustrated in FIG. 5 to FIG. 10. The circuit operation in the step-up discharge and the step-down discharge therefore will not be further elaborated.

(Control of Phase Shift Amount Based on Power Transmission Amount)

FIG. 14 is a graph for explaining control of a phase shift amount based on the power transmission amount in DC/DC converter 100 according to the first embodiment. The horizontal axes in three graphs in FIG. 14 show a power transmission amount P1 [W] from first DC power source PS1 to second DC power source (battery) PS2 and a power transmission amount P2 [W] from second DC power source (battery) PS2 to first DC power source PS1, in common. On the horizontal axes in FIG. 14, the power transmission amount P1 increases toward the right side, and the power transmission amount P2 increases toward the left side.

For example, as shown in the top graph in FIG. 14, control circuit 30 calculates the output DUTY ratio based on a power transmission command value Pref. In FIG. 14, when the first power transmission (charge of battery PS2) is performed, Pref=P1 (command value) is set. In comparison, when the second power transmission (discharge of battery PS2) is performed, Pref=−P2 (command value) is set. In this way, control circuit 30 can calculate the output DUTY ratio so that it is proportional to power transmission command value Pref.

(Change of Phase Shift Amount in First Power Transmission) First, the case of the first power transmission (charge of battery PS2) will be described in detail. As shown in the right half of the middle graph in FIG. 14, control circuit 30 performs the step-down charge operation when the power transmission amount P1 is between 0 to a first reference value Pr1 (Pr1>0), in other words, the output DUTY ratio is 0 to a first reference value Dr1 (Dr1>0).

In the step-down charge operation, control circuit 30 decreases the first phase shift amount θ1 as the power transmission amount P1, that is, the output DUTY ratio increases. Furthermore, the second phase shift amount θ2 can be virtually set, if necessary, such that a change is made in the same amount as in the first phase shift amount θ1.

When the power transmission amount P1 is greater than the first reference value Pr1, that is, when the output DUTY ratio is greater than the first reference value Dr1, control circuit 30 performs the step-up charge operation. At a switching point between step-down charge and step-up charge where Pref=Pr1 (output DUTY ratio=Dr1), the first phase shift amount θ1 and the second phase shift amount θ2 are equivalent. Hereinafter the first phase shift amount θ1 and the second phase shift amount θ2 at the switching point of P1=Pr1 may be referred to as reference phase shift amount θr.

In the step-up charge operation, control circuit 30 further decreases the first phase shift amount θ1 as the power transmission amount P1, that is, the output DUTY ratio increases from the switching point. In other words, in the entire region of Pref>0, the first phase shift amount θ1 continuously decreases with increase of the power transmission amount P1 (output DUTY ratio).

On the other hand, in the step-up charge operation, control circuit 30 increases the second phase shift amount θ2 from the switching point, with increase of the power transmission amount P1 (output DUTY ratio). In this way, in step-up charge, as the power transmission amount P1 (output DUTY ratio) increases, the first phase shift amount θ1 is decreased while the second phase shift amount θ2 is increased.

For example, the reference phase shift amount θr can be preset to correspond to the power transmission amount P1 (output DUTY ratio) at which the first phase shift amount θ1 and the second phase shift amount θ2 are 25% of the switching period Tsw.

When the power transmission amount P1 is in the range of 0≤P1≤Pr1, control circuit 30 decreases the first phase shift amount θ1 from the maximum amount to the reference phase shift amount θr (a phase shift amount corresponding to a time length of Tsw×0.25) at a constant slope. The maximum value is preset to a value (for example, a phase shift amount corresponding to a time length of Tsw×0.45) equal to or smaller than 50% of the switching period Tsw and greater than the reference phase shift amount θr (a phase shift amount corresponding to a time length of Tsw×0.25). The unit of phase shift amount is strictly speaking [rad], but the phase shift amount may be hereinafter denoted similarly using a time length corresponding to a multiple of the switching period Tsw.

On the other hand, when the power transmission amount P1 is in the range of Pr1≤P1≤2× Pr1, control circuit 30 decreases the first phase shift amount θ1 from the reference phase shift amount θr (25% of Tsw) to the minimum value (for example, Tsw×0.05) at the same slope as above. Furthermore, the second phase shift amount θ2 is increased from the reference phase shift amount θr (Tsw×0.25) to the maximum amount (for example, Tsw×0.45) at the same first slope.

The right half of the bottom graph in FIG. 14 shows changes of the first diagonal ON time t1, t1a and the second virtual diagonal ON time t2, t2a with respect to such changes of the first phase shift amount θ1 and the second phase shift amount θ2.

As described above, the first diagonal ON time t1, t1a is a value obtained by subtracting the first phase shift amount θ1 from the ON period of first reference element QB1.

Similarly, the second virtual diagonal ON time t2, t2a is a value obtained by subtracting the second phase shift amount θ2 from the ON period of first reference element QB1. Therefore, in FIG. 14, the behavior of the first diagonal ON time t1, t1a and the second virtual diagonal ON time t2, t2a has an upside-down graph waveform of the behavior of the first phase shift amount θ1 and the second phase shift amount θ2.

Here, in the first power transmission (charge of battery PS2), an output voltage from DC power source PS1 is applied to first winding 3a of transformer 3, and power transmission from first winding 3a to second winding 3b brings about a period in which voltage is produced on second winding 3b. This period is both of the first diagonal ON time t1 in which first reference element QB1 (first switching element Q4A on the positive electrode side) and first diagonal element QO1 (second switching element Q3B on the negative electrode side) simultaneously turn on and the first diagonal ON time t1a in which first switching element Q4B on the negative electrode side and second switching element Q3A on the positive electrode side simultaneously turn on.

At the time of step-down charge, the power transmission amount is controlled by adjusting the first phase shift amount θ1 of first converter 10 to adjust the first diagonal ON time t1, t1a. Furthermore, second converter 20 operates as a diode bridge and performs rectifying operation through the two-leg off operation that brings third bridge circuit 43 and fourth bridge circuit 44 into the off state both on the positive electrode side and the negative electrode side. The range of change of the first phase shift amount θ1 at the time of step-down charge is the range from the maximum value to the reference phase shift amount θr (25% of Tsw).

On the other hand, in the step-down charge in PTL 1, as shown in FIG. 3, a virtual shift amount is generated such that the second phase shift amount θ2 is the same amount as the first phase shift amount θ1, and the one-leg off operation is performed. Thus, second converter 20 matches the second virtual diagonal ON time t2, t2a with the first diagonal ON time t1, t1a by on/off of switching elements Q2A and Q2B and performs synchronous rectifying operation.

Thus, in the step-down charge in PTL 1, there is concern that a circulating current path as described below is produced in second converter 20 in which the one-leg off operation is performed in a period in which power transmission actually does not occur and both first converter 10 and second converter 20 output zero voltage.

As for "a period in which zero voltage is output" described above, in first converter 10, each of a period in which a current path including both of switching element Q3A or its antiparallel diode 51 and switching element Q4A or its antiparallel diode 51 is formed and a period in which a current path including both of switching element Q3B or its antiparallel diode 51 and switching element Q4B or its antiparallel diode 51 is formed may be hereinafter referred to as zero voltage period of first converter 10.

Similarly, in second converter 20, each of a period in which a current path including both of switching element Q1A or its antiparallel diode 51 and switching element Q2A or its antiparallel diode 51 is formed and a period in which a current path including both of switching element Q1B or its antiparallel diode 51 and switching element Q2B or its antiparallel diode 51 is formed may be referred to as zero voltage period of second converter 20.

Figure 15:
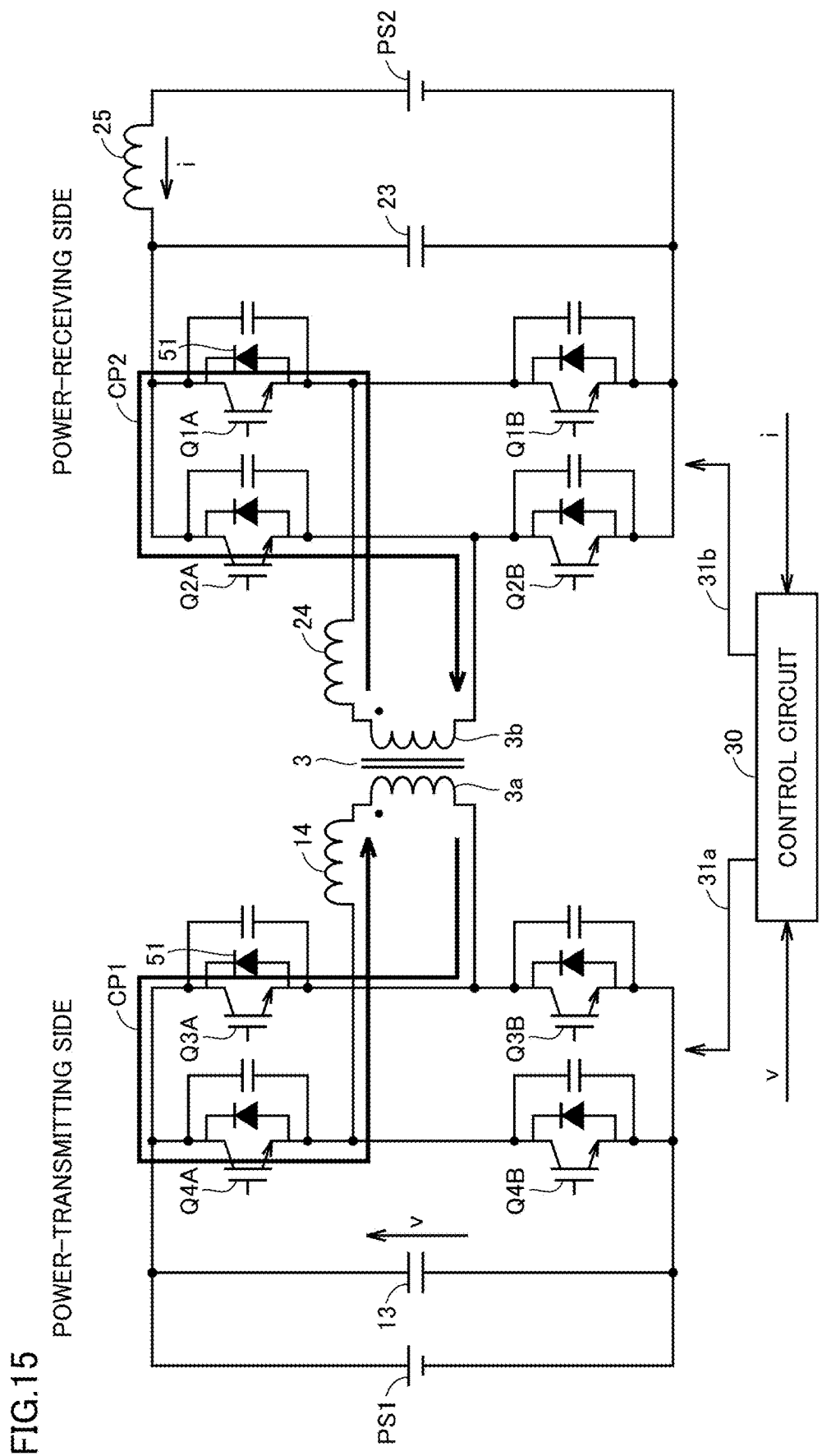
FIG. 15 is a first circuit diagram for explaining a circulating current path that may be produced in a zero voltage period when step-down charge is performed in accordance with FIG. 3.
Figure 16:
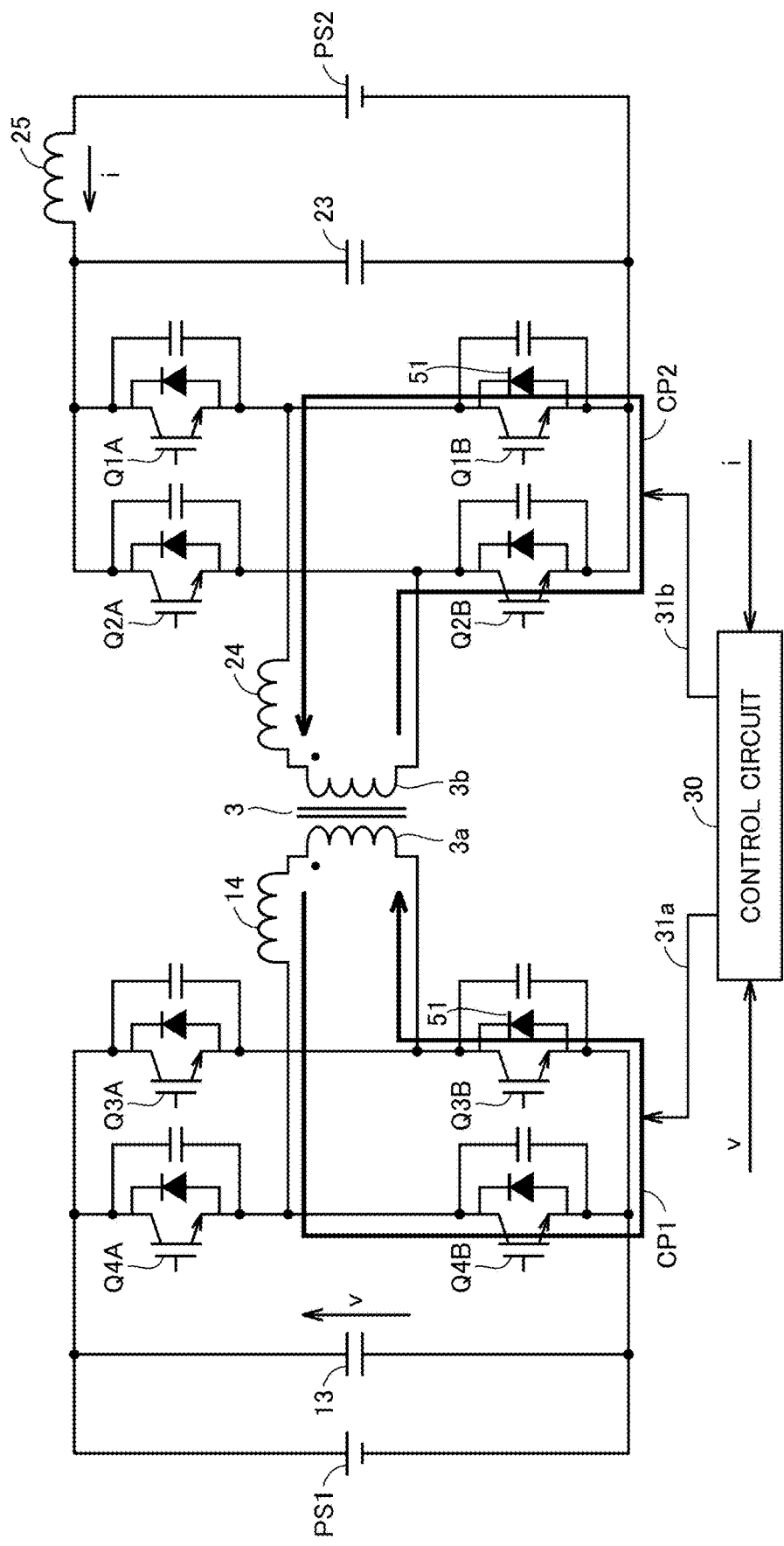
FIG. 16 is a second circuit diagram for explaining a circulating current path that may be produced in a zero voltage period when step-down charge is performed in accordance with FIG. 3.

FIG. 15 and FIG. 16 show a circulating current path which may be produced in a zero voltage period in step-down charge (that is, step-down charge in PTL 1) according to FIG. 3.

Referring to FIG. 15, in period A in FIG. 3, in first converter 10, since switching element Q4A is in the on state while switching element Q3B is in the off state, a current path CP1 including switching element Q4A and antiparallel diode 51 of switching element Q3A is formed (that is, zero voltage period). Furthermore, also in second converter 20, since switching element Q2A is brought to the on state, a current path CP2 including switching element Q2A and antiparallel diode 51 of switching element Q1A is formed (that is, zero voltage period).

As a result, a circulating current path including first converter 10 and second converter 20 may be produced through transformer 3 by current paths CP1 and CP2 in a period in which power transmission actually does not occur.

Similarly, referring to FIG. 16, in period F in FIG. 3, in first converter 10, since switching element Q4B is in the on state while switching element Q3A is in the off state, a current path CP1 including switching element Q4B and antiparallel diode 51 of switching element Q3B is formed (that is, zero voltage period). Furthermore, also in second converter 20, since switching element Q2B is brought to the on state, a current path CP2 including switching element Q2B and antiparallel diode 51 of switching element Q1B is formed (that is, zero voltage period).

As a result, also in FIG. 16, a circulating current path including first converter 10 and second converter 20 may be produced through transformer 3 by current paths CP1 and CP2 in a period in which power transmission actually does not occur.

In comparison, in step-down charge of DC/DC converter 100 according to the first embodiment, the first phase shift amount $\theta 1$ is gradually decreased with increase of the output DUTY ratio as described above, whereby the first diagonal ON time t1, t1$a$ a in first converter 10 is gradually increased while second converter 20 performs rectifying operation as a diode bridge through the two-leg off operation. That is, in second converter 20, all of third switching elements Q1A and Q1B of third bridge circuit 43 and fourth switching elements Q2A and Q2B of fourth bridge circuit 44 are in the off state.

Figure 17:
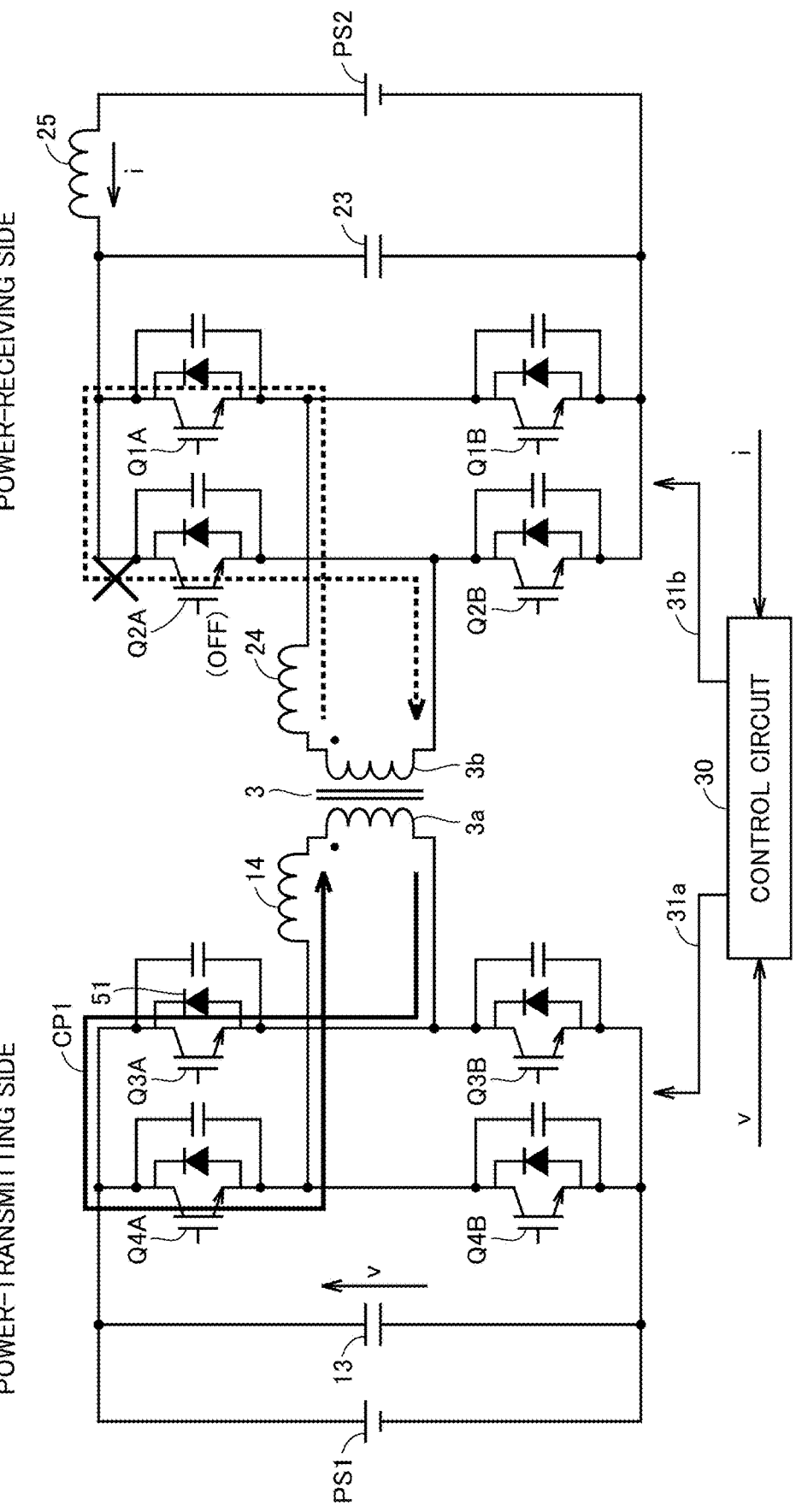
FIG. 17 is a first circuit diagram for explaining a current path in step-down discharge by the DC/DC converter according to the first embodiment.
Figure 18:
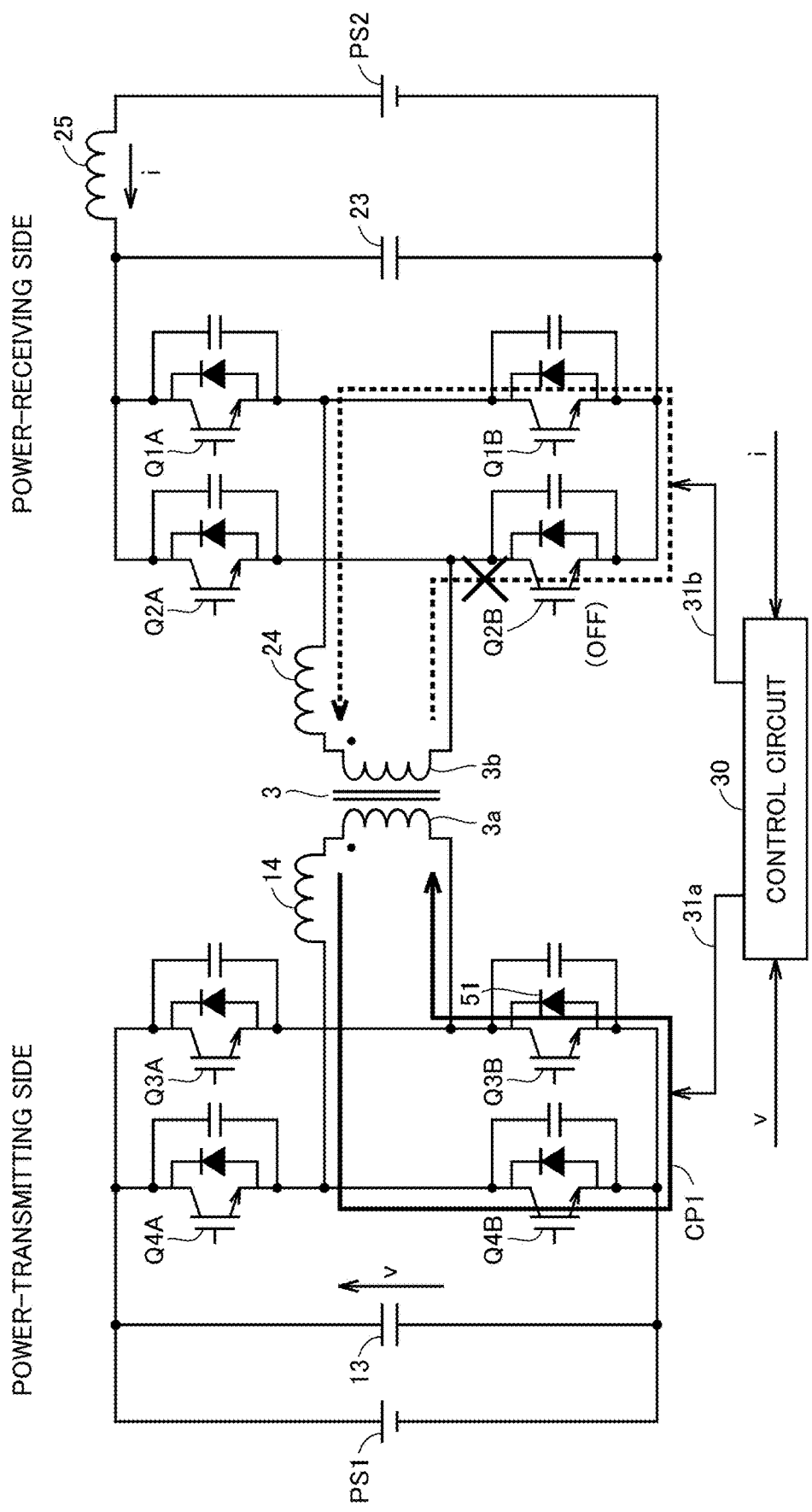
FIG. 18 is a second circuit diagram for explaining a current path in step-down discharge by the DC/DC converter according to the first embodiment.

FIG. 17 and FIG. 18 show a current path in the zero voltage period of the first converter in step-down charge of DC/DC converter 100 according to the first embodiment.

FIG. 17 shows a current path in period A in FIG. 2. In first converter 10, current path CP1 similar to that in FIG. 15 is formed, whereas in second converter 20, switching element Q2A is in the off state due to the two-leg off operation and therefore current path CP2 in FIG. 15 is not formed. As a result, in DC/DC converter 100, occurrence of the circulating current path as shown in FIG. 15 can be avoided.

Similarly, FIG. 18 shows a current path in period F in FIG. 2. In first converter 10, current path CP1 similar to that in FIG. 16 is formed, whereas in second converter 20, switching element Q2B is in the off state due to the two-leg off operation and therefore current path CP2 in FIG. 16 is not formed. As a result, in DC/DC converter 100, occurrence of the circulating current path as shown in FIG. 16 can be avoided.

In this way, in step-down charge of DC/DC converter 100 according to the first embodiment, conduction loss due to circulating current between first converter 10 and second converter 20 as in PTL 1 can be avoided.

Furthermore, in the gate pattern in FIG. 3, switching loss involved with on/off of switching elements Q2A and Q2B on the positive electrode side and the negative electrode side of fourth bridge circuit 44 occurs in second converter 20. On the other hand, in DC/DC converter 100 according to the first embodiment, all of switching elements Q3A, Q3B, Q4A, and Q4B are kept in the off state through the two-leg off operation of second converter 20. Therefore, switching loss in second converter 20 does not occur.

In this way, in step-down charge of DC/DC converter 100 according to the first embodiment, compared with step-down charge in PTL 1, conduction loss and switching loss can be reduced. Thus, the power conversion efficiency can be improved in step-down charge with a small power transmission amount.

Furthermore, in DC/DC converter 100 according to the first embodiment, power can be quickly adjusted at the time of switching between step-down charge and step-up charge as will be described below.

Referring to FIG. 2 again, in period C of step-down charge, which is immediately after second switching element Q3B on the negative electrode side (first diagonal element QO1) of first converter 10 turns on, first switching element Q4A on the positive electrode side (first reference element QB1) and second switching element Q3B on the negative electrode side (first diagonal element QO1) are simultaneously on, and the diagonal two elements become electrically continuous. Therefore, as described with reference to FIG. 7, energy is transmitted from the DC power source PS1 to first reactor 14 through first switching element Q4A on the positive electrode side and second switching element Q3B on the negative electrode side to excite first reactor 14.

On the other hand, in period C in FIG. 2, switching elements Q1A, Q1B, Q2A, and Q2B of second converter 20 are in the off state. Therefore, as described with reference to FIG. 7, power is transmitted from first winding 3$a$ to second winding 3$b$ to generate voltage on second winding 3$b$, whereby power is transmitted from DC power source PS1 to battery PS2 through a current path including antiparallel diode 51 of third switching element Q1A on the positive electrode side and antiparallel diode 51 of fourth switching element Q2B on the negative electrode side in second converter 20. At this moment, second reactor 24 is not excited, and step-up operation does not occur.

Figure 19:
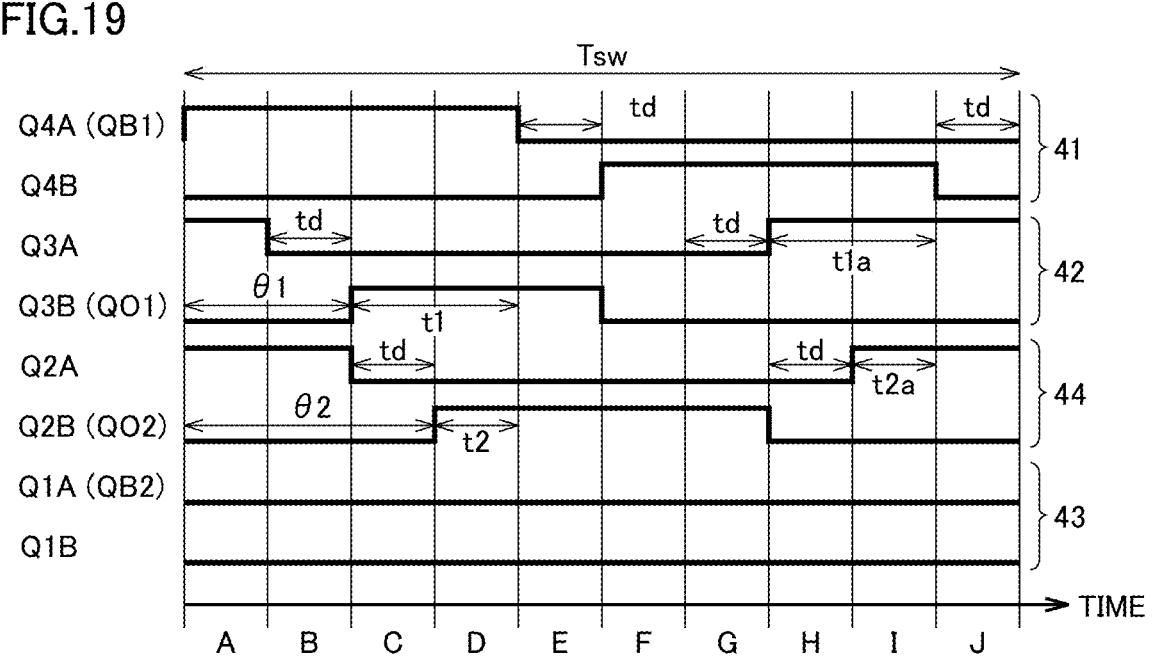
FIG. 19 is a time chart illustrating waveforms of on/off drive signals of switching elements when the phase difference between a first phase shift amount and a second phase shift amount is small in step-up charge by the DC/DC converter according to the first embodiment.

FIG. 19 is a time chart illustrating waveforms of on/off drive signals of the switching elements when the phase difference between the first phase shift amount $\theta 1$ and the second phase shift amount is small in DC/DC converter 100 according to the first embodiment. For example, the gate pattern in FIG. 19 occurs at the time of switching from step-down charge to step-up charge.

FIG. 19 shows a gate pattern when the first phase shift amount $\theta 1$ decreases from the reference phase shift amount $\theta r$ ($\theta r$=Tsw×0.25) by Tsw×0.05 and conversely, the second phase shift amount $\theta 2$ increases from the reference phase shift amount $\theta r$ by Tsw×0.05 in a region in which power transmission amount P1>Pr1 and step-up charge is applied in the graph in FIG. 14.

Therefore, as shown in FIG. 19, the phase difference between the first phase shift amount $\theta 1$ and the second phase shift amount $\theta 2$ is thus 10% of the switching period Tsw and equal to the short-circuit prevention time td.

Referring to FIG. 19, in period C, which is immediately after second switching element Q3B on the negative electrode side (first diagonal element QO1) of first converter 10 turns on, first switching element Q4A on the positive electrode side (first reference element QB1) and second switching element Q3B on the negative electrode side (first diagonal element QO1) simultaneously turn on, and the diagonal two elements become electrically continuous. Thus, energy is transmitted from DC power source PS1 to first reactor 14 through first switching element Q4A on the positive electrode side and second switching element Q3B on the negative electrode side to excite first reactor 14.

On the other hand, in FIG. 19, since the phase difference between the first phase shift amount θ1 and the second phase shift amount θ2 is equal to the short-circuit prevention time td, in second converter 20, period C is set as the short-circuit prevention time td for fourth switching elements Q2A and Q2B and fourth switching element Q2A on the positive electrode side is not turned on.

Therefore, in period C in FIG. 19, since a current path including antiparallel diode 51 of third switching element Q1A on the positive electrode side and antiparallel diode 51 of fourth switching element Q2B on the negative electrode side is formed in the same manner as at the time of step-down operation as described with reference to FIG. 7, power is transmitted from DC power source PS1 to battery PS2 without involving excitation of second reactor 24.

In this way, even when power transmission amount P1 is greater than first reference value Pr1 and thus step-up charge is applied, step-up operation actually does not occur when the phase difference Δθ between the first phase shift amount θ1 and the second phase shift amount θ2 is equal to or smaller than the short-circuit prevention time td. In the middle graph in FIG. 14, at the time of switching from step-down charge to step-up charge, the phase difference Δθ is small and the gate pattern in FIG. 19 is applied.

Figure 20:
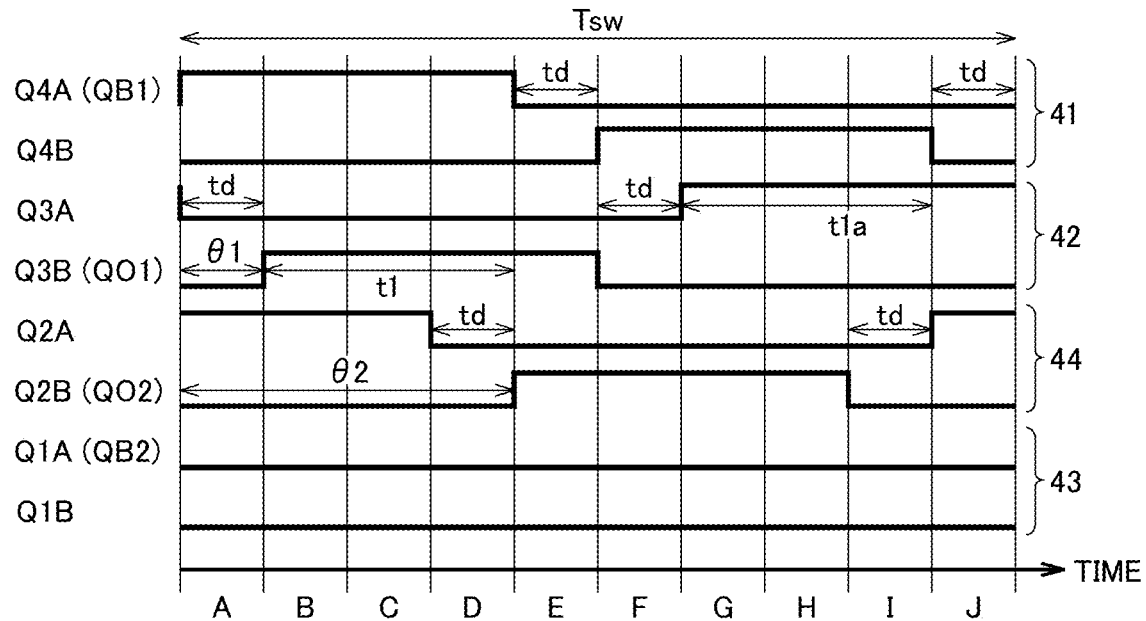
FIG. 20 is a time chart illustrating waveforms of on/off drive signals of switching elements when the phase difference between the first phase shift amount and the second phase shift amount is large in step-up charge by the DC/DC converter according to the first embodiment.

FIG. 20 is a time chart illustrating waveforms of on/off drive signals of the switching elements when the phase difference between the first phase shift amount θ1 and the second phase shift amount θ2 is greater than the short-circuit prevention time td.

FIG. 20 shows a gate pattern when the power transmission amount P1 is greater than that in FIG. 19, the first phase shift amount θ1 decreases from the reference phase shift amount θr (θr=Tsw×0.25) by Tsw×0.15, and conversely the second phase shift amount θ2 increases from the reference phase shift amount θr by Tsw×0.15. Therefore, the phase difference Δθ between the first phase shift amount θ1 and the second phase shift amount θ2 is 30% of the switching period Tsw, three times as large as the short-circuit prevention time td.

In period B in FIG. 20, first switching element Q4A on the positive electrode side (first reference element QB1) and second switching element Q3B on the negative electrode side (first diagonal element QO1) of first converter 10 are simultaneously on, and the diagonal two elements become electrically continuous. Thus, power is transmitted from DC power source PS1 to first reactor 14 to excite first reactor 14, in the same manner as described with reference to FIG. 5.

If the phase difference Δθ is large, fourth switching element Q2A on the positive electrode side of second converter 20 turns on in this period B. Therefore, current on a path including fourth switching element Q2A on the positive electrode side and antiparallel diode 51 of third switching element Q1A on the positive electrode side circulates to second reactor 24 to excite second reactor 24, in the same manner as described with reference to FIG. 5. Therefore, in period B, first reactor 14 and second reactor 24 are excited whereby step-up operation of second reactor 24 occurs.

Since the state in period C in FIG. 20 is the same as in period B, the excitation of first reactor 14 and second reactor 24 continues. In period D, since first converter 10 is in the same state as in periods B and C, the excitation of first reactor 14 continues.

On the other hand, in period D, since the short-circuit prevention time td applies in second converter 20, fourth switching element Q2A on the positive electrode side turns off. Thus, current flows toward battery PS2 through antiparallel diode 51 of third switching element Q1A on the positive electrode side and antiparallel diode 51 of fourth switching element Q2B on the negative electrode side, in the same manner as described with reference to FIG. 5.

As a result, in period D, excitation energy of first reactor 14 and second reactor 24 is transmitted toward battery PS2. Accordingly, in the gate pattern shown in FIG. 20, charge of battery PS2 actually involving step-up operation of second reactor 24, that is, step-up charge is performed.

In this way, the step-up operation of second reactor 24 is performed actually in a period obtained by subtracting the short-circuit prevention time td from the phase difference Δθ between the first phase shift amount θ1 and the second phase shift amount θ2. That is, in the gate pattern in FIG. 19, since the power transmission amount P1 is greater than first reference value Pr1, step-up charge is applied. However, the phase difference Δθ between the first phase shift amount θ1 and the second phase shift amount θ2 does not increase to an extent exceeding the short-circuit prevention time td, and therefore actually step-up operation does not occur. Therefore, the power transmission amount in FIG. 19 is equal to the power transmission amount in step-down charge in FIG. 2.

In this case, it can be determined whether step-up operation is involved by comparison of the phase difference Δθ between the first phase shift amount θ1 and the second phase shift amount θ2 set according to FIG. 14 with the short-circuit prevention time td. In this way, when step-up operation is not involved because Δθ≤td, the first phase shift amount θ1 is operated to allow second converter 20 to perform two-leg off operation. When second converter 20 shifts to the one-leg off operation involving step-up operation, the phase difference Δθ is made equal to the short-circuit prevention time td at the switching point of P1=Pr1, and the first phase shift amount θ1 and the second phase shift amount θ2 can be set such that the phase difference Δθ increases as the power transmission amount P1 increases. For example, the second phase shift amount θ2 can be set such that the phase difference Δθ from the first phase shift amount θ1 (that is, the reference phase shift amount θr) at the switching point is equivalent to the short-circuit prevention time td (corresponding to FIG. 17). Furthermore, the first phase shift amount θ1 and the second phase shift amount θ2 can be decreased or increased from the respective values at the switching point such that the phase difference Δθ increases as the power transmission amount P1 increases from the switching point.

If the two-leg off operation does not shift to the one-leg off operation but the mode of two-leg off operation is shifted to a mode of allowing all the legs to perform switching operation, the rectifying function of antiparallel diode 51 in two-leg off operation need to be simulated by active switching operation by control circuit 30 at the moment of switching. This is likely to cause a difference in transmission power amount. In comparison, when second converter 20 shifts from two-leg off operation to one-leg off operation as in DC/DC converter 100 according to the first embodiment, the rectifying function of antiparallel diode 51 can be used as it is. Therefore, as shown in the gate pattern in FIG. 3, allowing second converter 20 to perform one-leg off operation in step-up charge enables smooth switching from step-down charge to step-up charge and facilitates control of the transmission power amount.

However, the circuit operation according to FIG. 2 (step-down charge) and the circuit operation according to FIG. 19 (step-up charge) are different in whether a circuiting current path is produced. Therefore, in practice, there is a possibility that a difference occurs in power transmission amount between them because circulating current produced by the effect of excitation current or circuit parasitic capacitance influences the power transmission amount.

(Change of Phase Shift Amount in Second Power Transmission)

Next, the case of the second power transmission (discharge of battery PS2) will be described in detail. As shown in FIG. 1, the circuit configuration of DC/DC converter 100 is symmetric with respect to transformer 3. Because of this circuit symmetry, the control operation of DC/DC converter 100 is symmetric between the first power transmission and the second power transmission in FIG. 14.

As shown by the left half of the top graph in FIG. 14, in the case of the second power transmission, the output DUTY ratio increases in the negative direction as the power transmission amount P2 increases. In other words, the power transmission amount P2 and the output DUTY ratio are reverse in sign.

When the power transmission amount P2 is in the range of 0 to a second reference value Pr2 (Pr2>0), in other words, when the output DUTY ratio is in the range of 0 to second reference value Dr2 (Dr2<0), control circuit 30 performs the step-down discharge operation.

In the step-down discharge operation, control circuit 30 decreases the third phase shift amount θ3 as the power transmission amount P2 increases, that is, the output DUTY ratio increases in the negative direction. Furthermore, the fourth phase shift amount θ4 may be virtually set, if necessary, such that a change in the same amount as in the third phase shift amount θ3 is made.

When the power transmission amount P2 is greater than the second reference value Pr2, that is, when the output DUTY ratio is greater than the second reference value Dr2 in the negative direction, control circuit 30 performs the step-up discharge operation. At a switching point between step-down discharge and step up discharge where Pref=−P2 (output DUTY ratio=Dr2), the third phase shift amount θ3 and the fourth phase shift amount θ4 are equivalent.

In the step-up discharge operation, control circuit 30 further decreases the third phase shift amount θ3 as the power transmission amount P2 increases from the switching point, that is, as the output DUTY ratio increases in the negative direction. In other words, in the entire region of Pref<0, the third phase shift amount θ3 continuously decreases with increase of the power transmission amount P2 (increase of the output DUTY ratio in the negative direction).

On the other hand, in the step-up discharge operation, control circuit 30 increases the fourth phase shift amount θ4 with increase of the power transmission amount P2 (increase of the output DUTY ratio in the negative direction) from the switching point. In this way, in step-up discharge, as the power transmission amount P2 increases (increase of the output DUTY ratio in the negative direction), the third phase shift amount θ3 is decreased while the fourth phase shift amount θ4 is increased.

For example, the reference phase shift amount θr corresponding to the second reference value Pr2 can be preset to correspond to the power transmission amount P2 (output DUTY ratio) at which the third phase shift amount θ3 and the fourth phase shift amount θ4 are 25% of the switching period Tsw, in the same manner as in the first power transmission.

When the power transmission amount P2 is in the range of 0≤P2≤Pr2, control circuit 30 decreases the third phase shift amount θ3 from the maximum amount to the reference phase shift amount θr (Tsw×0.25) at a constant slope common to the first power transmission. On the other hand, when the power transmission amount P2 is in the range of Pr2≤P2≤2×Pr2, control circuit 30 decreases the third phase shift amount θ3 from the reference phase shift amount θr (25% of Tsw) to the minimum value at the slope above and increases the fourth phase shift amount θ4 from the reference phase shift amount θr (Tsw×0.25) to the maximum value at the same slope. The maximum value and the minimum value are set in common with the first power transmission.

The left half of the bottom graph in FIG. 14 shows changes of the third diagonal ON time t3, t3a and the fourth virtual diagonal ON time t4, t4a with respect to such changes of the third phase shift amount θ3 and the fourth phase shift amount θ4.

As described above, the third diagonal ON time t3, t3a is a value obtained by subtracting the third phase shift amount θ3 from the ON period of second reference element QB2. Similarly, the fourth virtual diagonal ON time t4, t4a is a value obtained by subtracting the fourth phase shift amount θ4 from the ON period of second reference element QB2. Therefore, in FIG. 14, the behavior of the third diagonal ON time t3, t3a and the fourth virtual diagonal ON time t4, t4a has an upside-down graph waveform of the behavior of the third phase shift amount θ3 and the fourth phase shift amount θ4.

In FIG. 14, both of the first phase shift amount θ1 at the time of charge and the fourth phase shift amount θ4 at the time of discharge correspond to the phase shift amount of first diagonal element QO1 (second switching element Q3B on the negative electrode side) and are depicted by similar solid lines.

Furthermore, both of the second phase shift amount θ2 at the time of charge and the third phase shift amount θ3 at the time of discharge correspond to the phase shift amount of second diagonal element QO2 (fourth switching element Q2B on the negative electrode side) and are depicted by similar dotted lines. Similarly, the first diagonal ON time t1 and the fourth virtual diagonal ON time t4 are depicted by similar solid lines, and the second virtual diagonal ON time t2 and the third diagonal ON time t3 are depicted by similar dotted lines.

Figure 21:
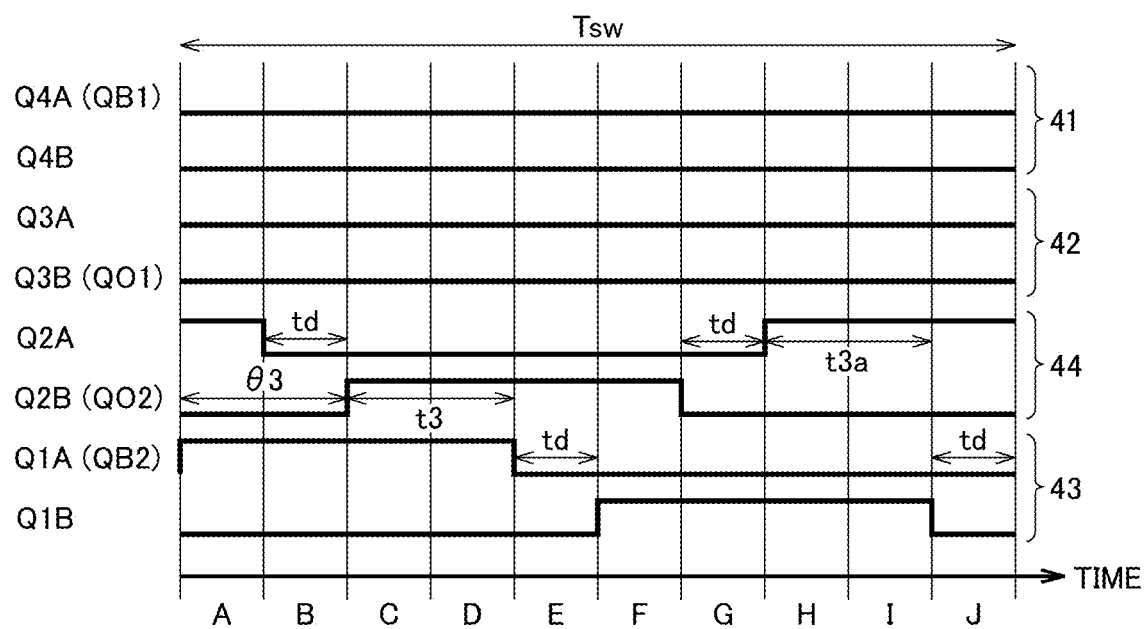
FIG. 21 is a time chart illustrating waveforms of on/off drive signals of switching elements in step-down discharge by the DC/DC converter according to the first embodiment.

FIG. 21 is a time chart illustrating waveforms of on/off drive signals of the switching elements in step-down discharge of DC/DC converter 100 according to the first embodiment.

Referring to FIG. 21, in the step-down discharge operation, conversely to step-down charge (FIG. 2), second converter 20 is the power transmitting side and first converter 10 is the power receiving side. Therefore, third switching elements Q1A and Q1B of second converter 20 are turned on/off in the same manner as first switching elements Q4A and Q4B of first converter 10 in FIG. 2 (step-down discharge). Similarly, fourth switching elements Q2A and Q2B of second converter 20 are turned on/off in the same manner as second switching elements Q3A and Q3B of first converter 10 in FIG. 2 (step-down discharge).

Furthermore, first converter 10 on the power-receiving side performs two-leg off operation, in the same manner as second converter 20 in FIG. 2 (step-down discharge). That is, first switching elements Q4A and Q4B of first bridge circuit 41 and second switching elements Q3A and Q3B of second bridge circuit 42 are kept in the off state.

Thus, even in step-down discharge, occurrence of a current path in first converter 10 on the power-receiving side can be avoided, in the same manner as second converter 20 in FIG. 17 and FIG. 18. Thus, even in step-down charge of DC/DC converter 100 according to the first embodiment, occurrence of a circulating current path between first converter 10 and second converter 20 through transformer 3 as in PTL 1 can be suppressed. As a result, conduction loss due to circulating current and switching loss in first converter 10 can be reduced, thereby improving the power conversion efficiency in step-down discharge with a small power transmission amount.

Next, switching between step-down discharge and step-up discharge in DC/DC converter 100 according to the first embodiment will be described.

Figure 22:
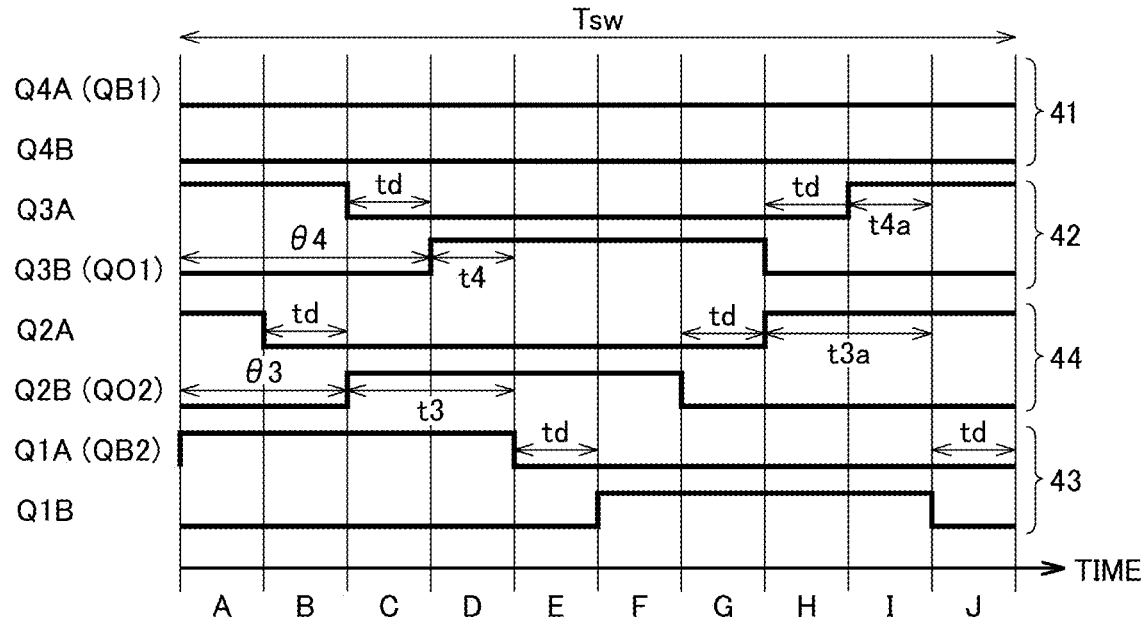
FIG. 22 is a time chart illustrating waveforms of on/off drive signals of switching elements when the phase difference between the first phase shift amount and the second phase shift amount is small in step-up discharge by the DC/DC converter according to the first embodiment.

FIG. 22 is a time chart illustrating waveforms of on/off drive signals of the switching elements at the time of step-up discharge, corresponding to FIG. 19 at the time of step-up charge.

FIG. 22 shows a gate pattern when the third phase shift amount θ3 decreases from the reference phase shift amount θr (θr=Tsw×0.25) by Tsw×0.05 and conversely, the fourth phase shift amount θ4 increases from the reference phase shift amount θr by Tsw×0.05, in a region in which the power transmission amount P2>Pr2 and step-up discharge is applied. As a result, the phase difference between the third phase shift amount θ3 and the fourth phase shift amount θ4 is 10% of the switching period Tsw and equal to the short-circuit prevention time td.

In the on/off drive signals of the switching elements at the time of step-up discharge shown in FIG. 22, the on/off drive signals of first switching elements Q4A and Q4B and the on/off drive signals of third switching elements Q1A and Q1B at the time of step-up charge shown in FIG. 19 are replaced with each other, and the on/off drive signals of second switching element Q3A and Q3B and the on/off drive signals of fourth switching elements Q2A and Q2B are replaced with each other.

Therefore, the circuit operation in the gate pattern in FIG. 22 is similar to the circuit operation in the gate pattern in FIG. 19 and has the power transmission direction reversed. That is, FIG. 22 shows a gate pattern in step-up discharge in which the power transmission amount P2 is greater than the second reference value Pr2. However, the phase difference Δθ between the third phase shift amount θ3 and the fourth phase shift amount θ4 is equal to or smaller than the short-circuit prevention time td, and therefore, actually step-up operation of first reactor 14 does not occur.

Figure 23:
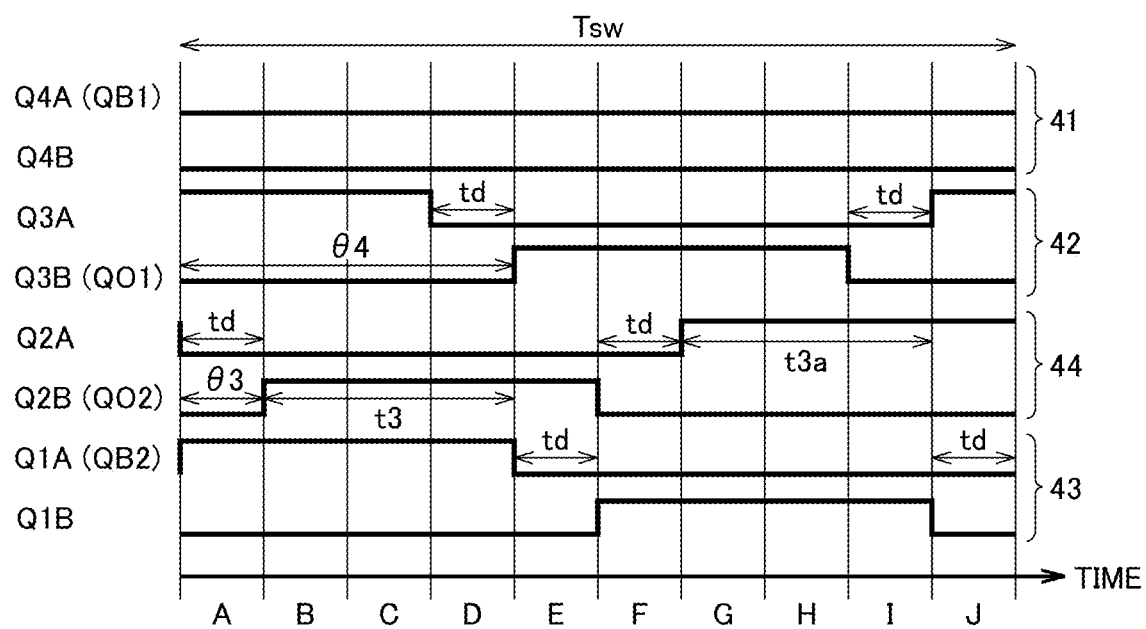
FIG. 23 is a time chart illustrating waveforms of on/off drive signals of switching elements when the phase difference between the first phase shift amount and the second phase shift amount is large in step-up discharge by the DC/DC converter according to the first embodiment.

FIG. 23 is a time chart illustrating waveforms of the drive signals of the switching elements at the time of step-up discharge, corresponding to FIG. 20 at the time of step-up charge.

FIG. 23 shows a gate pattern when the power transmission amount P2 is greater than that in FIG. 22, the third phase shift amount θ3 decreases from the reference phase shift amount θr (θr=Tsw×0.25) by Tsw×0.15, and conversely the fourth phase shift amount θ4 increases from the reference phase shift amount θr by Tsw×0.15. At this moment, the phase difference Δθ between the third phase shift amount θ3 and the fourth phase shift amount θ4 is 30% of switching period Tsw, three times as large as the short-circuit prevention time td.

In the on/off drive signals of the switching elements at the time of step-up discharge shown in FIG. 23, the on/off drive signals of first switching elements Q4A and Q4B and the on/off drive signals of third switching elements Q1A and Q1B at the time of step-up charge shown in FIG. 20 are replaced with each other, and the on/off drive signals of second switching elements Q3A and Q3B and the on/off drive signals of fourth switching elements Q2A and Q2B are replaced with each other.

Therefore, the circuit operation in the gate pattern in FIG. 23 is similar to the circuit operation in the gate pattern in FIG. 20 and has the power transmission direction reversed. That is, in FIG. 23, the phase difference Δθ between the third phase shift amount θ3 and the fourth phase shift amount θ4 increases to an extent exceeding the short-circuit prevention time td, and step-up operation of first reactor 14 occurs. In this way, in step-up discharge, the step-up operation of first reactor 14 is actually performed in a period obtained by subtracting the short-circuit prevention time td from the phase difference Δθ between the third phase shift amount θ3 and the fourth phase shift amount θ4.

Therefore, setting the third phase shift amount θ3 and the fourth phase shift amount θ4 in consideration of the short-circuit prevention time td in the same manner as the step-down charge described above enables smooth switching from step-down discharge to step-up discharge and facilitates control of the transmission power amount.

Specifically, when step-up operation is not involved because Δθ≤td, the third phase shift amount θ3 is operated to allow first converter 10 to perform two-leg off operation. In addition, when first converter 10 shifts to one-leg off operation involving step-up operation, the phase difference Δθ is made equal to the short-circuit prevention time td at the switching point of P2=Pr2. For example, the fourth phase shift amount θ4 can be set such that the phase difference Δθ from the third phase shift amount θ3 (that is, the reference phase shift amount θr) at the switching point is equivalent to the short-circuit prevention time td (corresponding to FIG. 20). Furthermore, the third phase shift amount θ3 and the fourth phase shift amount θ4 can be decreased or increased from the respective values at the switching point such that the phase difference Δθ increases as the power transmission amount P2 increases from the switching point. In this way, allowing first converter 10 to perform one-leg off operation in step-up discharge enables smooth switching operation even from step-down discharge to step-up discharge and facilitates control of the power transmission amount.

As described above, in DC/DC converter 100 according to the present first embodiment, the power receiving-side converters of first converter 10 and second converter 20 perform two-leg off operation in step-down operation (step-down charge and step-down discharge), whereby occurrence of circulating current in first converter 10 and second converter 20 described with reference to FIG. 15 and FIG. 16 can be avoided, and switching loss can be suppressed in the power receiving-side converters, thereby improving the power conversion efficiency. Furthermore, in step-up operation (step-up charge and step-up discharge), the power receiving-side converters of first converter 10 and second converter 20 perform one-leg off operation, whereby switching from step-down operation to step-up operation can be smoothened.

Second Embodiment

A DC/DC converter according to a second embodiment will now be described. The DC/DC converter according to the second embodiment is similar to that of the first embodiment in circuit configuration and basic control but differs from the first embodiment in control of the phase shift amount based on the power transmission amount. In the second embodiment, a description of parts similar to those in the first embodiment is basically not repeated.

Figure 24:
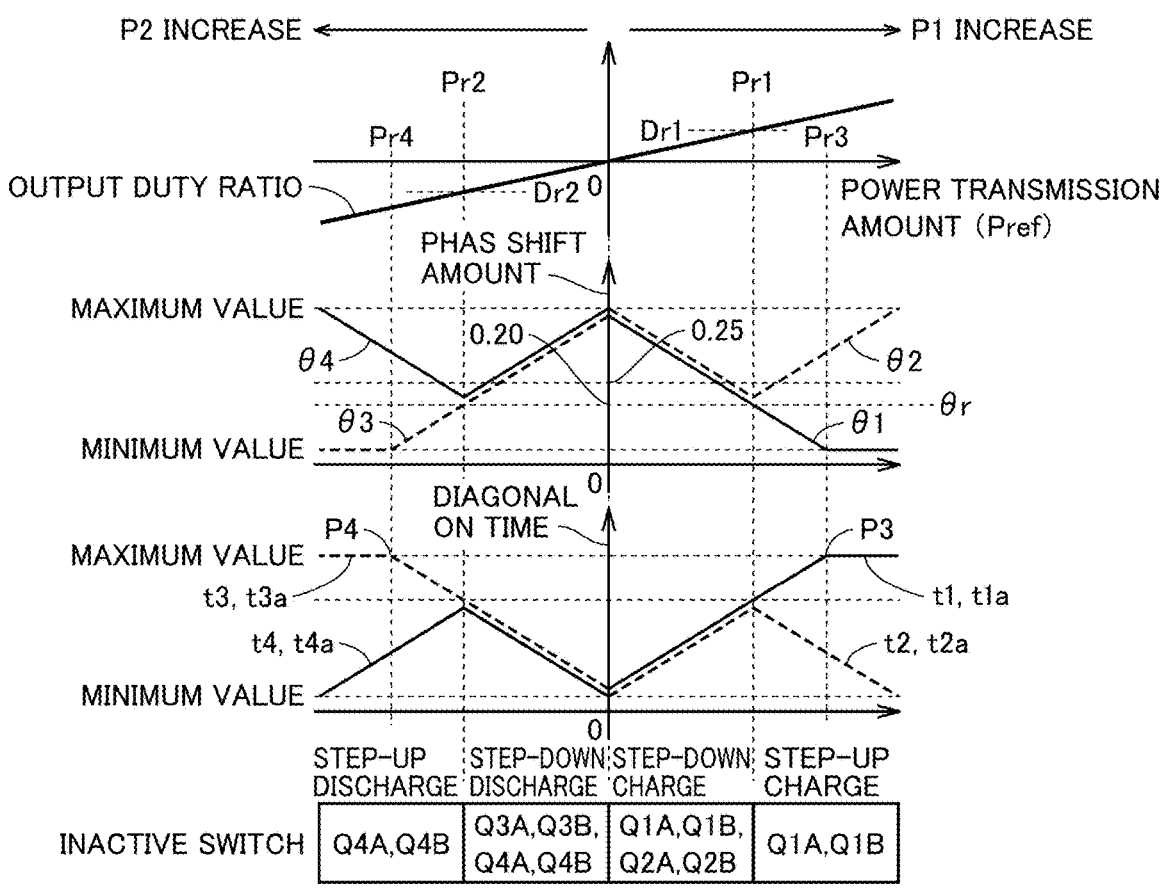
FIG. 24 is a graph for explaining control of the phase shift amount based on the power transmission amount in a DC/DC converter according to a second embodiment.

FIG. 24 is a graph for explaining control of the phase shift amount based on the power transmission amount in the DC/DC converter according to the second embodiment.

Referring to FIG. 24, the top graph is the same as that of FIG. 14, whereas the middle graph differs from that of FIG. 14.

First, the case of the first power transmission (charge of battery PS2) will be described in detail. As shown in the right half of the middle graph in Fig. 24 control circuit 30 decreases the first phase shift amount θ1 as the power transmission amount P1 (output DUTY ratio) increases when the power transmission amount P1 is in the range of 0 to first reference value Pr1 (Pr1>0), in other words, when the output DUTY ratio is in the range of 0 to first reference value Dr1 (Dr1>0). Furthermore, the second phase shift amount θ2 can be virtually set, if necessary, such that a change in the same amount as in the first phase shift amount θ1 is made. As described above, at the switching point of P1=Pr1, a phase difference equivalent to the short-circuit prevention time td may be provided between the first phase shift amount θ1 and the second phase shift amount θ2.

When the power transmission amount P1 (output DUTY ratio) is between the first reference value Pr1 and the third reference value Pr3 (Pr3>Pr1), control circuit 30 decreases the first phase shift amount θ1 and increases the second phase shift amount θ2, with respect to the first phase shift amount θ1 and the second phase shift amount θ2 (reference phase shift amount θr) where P1=Pr1, as the power transmission amount P1 (output DUTY ratio) increases.

When the power transmission amount P1 (output DUTY ratio) is greater than the third reference value Pr3 (Pr3>Pr1), control circuit 30 increases the second phase shift amount θ2 with respect to the second phase shift amount θ2 when P1=Pr3, as the power transmission amount P1 (output DUTY ratio) increases. On the other hand, in the range of P1>Pr3, control circuit 30 keeps the first phase shift amount θ1 when P1=Pr3.

Even in the DC/DC converter according to the second embodiment, in the same manner as the first embodiment, the range in which the power transmission amount P1 is from 0 to the first reference value Pr1 is a section in which step-down charge is performed, and the range in which the power transmission amount P1 is greater than the first reference value Pr1 is a section in which step-up charge is performed.

In the second embodiment, the reference phase shift amount θr corresponding to the first phase shift amount θ1 when P1=Pr1 is preset to a value smaller than that in the first embodiment (for example, 20% of switching period Tsw). Furthermore, the third reference value Pr3 is preset to equivalent to the power transmission amount P1 (output DUTY ratio) when the first phase shift amount θ1 is 5% of the switching period Tsw.

When the power transmission amount P1 (output DUTY ratio) is between 0 and the first reference value Pr1, control circuit 30 decreases the first phase shift amount θ1 from the maximum value (for example, Tsw×0.45 in common to the first embodiment) to the reference phase shift amount θr (for example, Tsw×0.2) at a constant slope. Furthermore, the virtually set second phase shift amount θ2 is decreased in the same amount as in the first phase shift amount θ1, if necessary.

When the power transmission amount P1 (output DUTY ratio) is between the first reference value Pr1 and the third reference value Pr3, control circuit 30 decreases the first phase shift amount θ1 from the first phase shift amount θ1 at P1=Pr1 to the minimum value (for example, Tsw×0.05 in common to the first embodiment) at the same constant slope as above. On the other hand, the second phase shift amount θ2 is increased from the second phase shift amount θ2 at P1=Pr1 at the same slope as above. When the power transmission amount P1 (output DUTY ratio) is between the third reference value Pr3 and the value twice the first reference value Pr1, control circuit 30 fixes the first phase shift amount θ1 to the minimum value and continuously increases the second phase shift amount θ2 up to the maximum value while keeping the same slope.

As shown in the right half of the bottom graph in FIG. 24, the first diagonal ON time t1, t1a and the second virtual diagonal ON time t2, t2a have an upside-down shape of the first phase shift amount θ1 and the second phase shift amount θ2.

Next, the case of the second power transmission (discharge of battery PS2) will be described in detail. As shown in the left half of the middle graph in FIG. 24, control circuit 30 decreases the third phase shift amount θ3 as the power transmission amount P2 increases (the output DUTY ratio increases in the negative direction) when the power transmission amount P2 is between 0 and the second reference value Pr2 (Pr2>0), in other words, the output DUTY ratio is between 0 and the second reference value Dr2 (Dr2<0). Furthermore, the fourth phase shift amount θ4 can be virtually set, if necessary, such that a change in the same amount as in the third phase shift amount θ3 is made. As described above, at the switching point of P2=Pr2, a phase difference equivalent to the short-circuit prevention time td may be provided between the third phase shift amount θ3 and the fourth phase shift amount θ4.

When the power transmission amount P2 is between the second reference value Pr2 and the fourth reference value Pr4 (Pr4>Pr2), control circuit 30 decreases the third phase shift amount θ3 and increases the fourth phase shift amount θ4, with respect to the third phase shift amount θ3 and the fourth phase shift amount θ4 where P2=Pr2, as the power transmission amount P2 increases (the output DUTY ratio increases in the negative direction).

When the power transmission amount P2 is greater than the fourth reference value Pr4 (Pr4>Pr2), that is, when the output DUTY ratio is greater than the second reference value Dr2 in the negative direction, control circuit 30 increases the fourth phase shift amount θ4 with respect to the fourth phase shift amount θ4 when P2=Pr4, with increase of the power transmission amount P2 (increase of the output DUTY ratio in the negative direction). On the other hand, in the range of P2≥Pr4, control circuit 30 keeps the third phase shift amount θ3 when P2=Pr4.

Even in the DC/DC converter according to the second embodiment, in the same manner as the first embodiment, the range in which the power transmission amount P2 is from 0 to the second reference value Pr2 is a range in which step-down discharge is performed, and the range in which the power transmission amount P2 is greater than the second reference value Pr2 is a range in which step-up discharge is performed.

In the second embodiment, the reference phase shift amount θr corresponding to the third phase shift amount θ3 when P2=Pr2 is preset to a value common to charge operation. Furthermore, the fourth reference value Pr4 is preset to equivalent to the power transmission amount P2 (output DUTY ratio) when the first phase shift amount θ3 is 5% of the switching period Tsw.

When the power transmission amount P2 is between 0 and the second reference value Pr2, control circuit 30 decreases the third phase shift amount θ3 from the maximum value to the reference phase shift amount θr (for example, Tsw×0.2) at a constant slope.

When the power transmission amount P2 is between the second reference value Pr2 and the fourth reference value Pr4, control circuit 30 decreases the third phase shift amount θ3 from the reference phase shift amount θr (Tsw×0.2) to the minimum value at the same constant slope as above. On the other hand, the fourth phase shift amount θ4 is increased from the fourth phase shift amount θ4 at P2=Pr1 at the same slope as above. When the power transmission amount P1 (output DUTY ratio) is between the fourth reference value Pr4 and the value twice the second reference value Pr2, control circuit 30 fixes the third phase shift amount θ3 to the minimum value and continuously increases the fourth phase shift amount θ4 up to the maximum value while keeping the same slope.

As shown in the left half of the bottom graph in FIG. 24, the third diagonal ON time t3, t3a and the fourth virtual diagonal ON time t4, t4a have an upside-down shape of the third phase shift amount θ3 and the fourth phase shift amount θ4.

In the DC/DC converter according to the second embodiment, compared with the first embodiment, the range of step-down charge or step-down discharge (the range of the power transmission amount P1, P2 or the output DUTY ratio) is expanded. Thus, the effect of improving the power conversion efficiency at the time of step-down operation described in the first embodiment can be enhanced.

In FIG. 14 and FIG. 24, a simple example in which the output DUTY ratio is set in a proportional relation to the command values of the power transmission amounts P1 and P2 has been described. However, the output DUTY ratio may be calculated by feedback control of the detected values of current and voltage in the same manner as in PTL 1.

Figure 25:
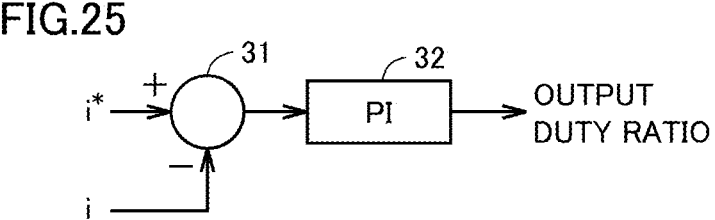
FIG. 25 is a block diagram for explaining a first modification of calculation of an output DUTY ratio by a control circuit.

FIG. 25 is a block diagram for explaining a first modification of calculation of the output DUTY ratio by control circuit 30.

Referring to FIG. 25, control circuit 30 includes a subtractor 31 and a control calculator 32. Subtractor 31 subtracts a current detection value i of battery PS2 from a current command value i* of battery PS2 to calculate a current deviation Δi. Current command value i* can be set based on the power transmission amount P1 or P2 between first DC power source PS1 and second DC power source PS2. Current command value i* is set to a negative value (i*<0) at the time of charge of battery PS2 (first power transmission) and is set to a positive value (i*>0) at the time of discharge (second power transmission).

Control calculator 32 calculates an output DUTY ratio by proportional integral (PI) control calculation of current deviation Δi. By doing so, feedback control to change the output DUTY ratio can be performed such that charge/discharge current (current i) approaches the current command value i* in charge (first power transmission) or discharge (second power transmission) of battery PS2.

Figure 26:
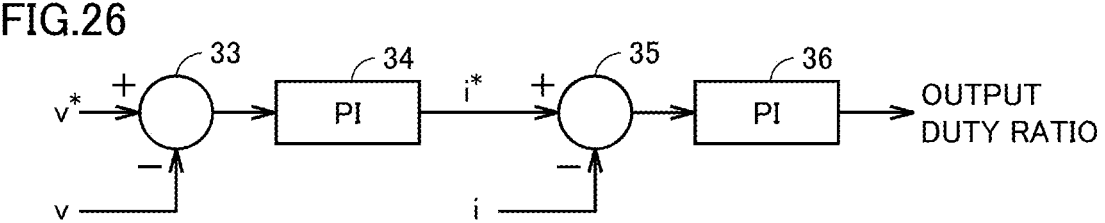
FIG. 26 is a block diagram for explaining a second modification of calculation of the output DUTY ratio by the control circuit.

FIG. 26 is a block diagram for explaining a second modification of calculation of the output DUTY ratio by control circuit 30.

Referring to FIG. 26, control circuit 30 includes subtractors 33 and 35 and control calculators 34 and 36. Subtractor 33 subtracts a voltage detection value v of DC power source PS1 from a voltage command value v* of DC power source PS1 to calculate a voltage deviation Δv. The voltage command value v* can be set based on the power transmission amount P1 or P2.

Control calculator 34 calculates a current command value i* of battery PS2 by proportional integral (PI) control calculation of the voltage deviation Δv. Furthermore, subtractor 35 subtracts the current detection value i of battery PS2 from the current command value i* from control calculator 34 to calculate a current deviation Δi. Control calculator 36 calculates an output DUTY ratio by proportional integral (PI) control calculation of the current deviation Δi.

Thus, feedback control to change the output DUTY ratio can be performed such that the output voltage v of DC power source PS1 approaches the voltage command value v* set based on the power transmission amounts P1 and P2. Alternatively, the output DUTY ratio may be directly calculated by proportional integral (PI) control calculation for the voltage deviation Δv.

In the present embodiment, the output DUTY ratio as an intermediate variable can be calculated by any calculation formula as long as the object of controlling the power transmission amount by the first power transmission or the second power transmission is met.

Third Embodiment

In a third embodiment, a configuration example of a power conversion device including a plurality of DC/DC converters in the first embodiment or the second embodiment will be described.

Figure 27:
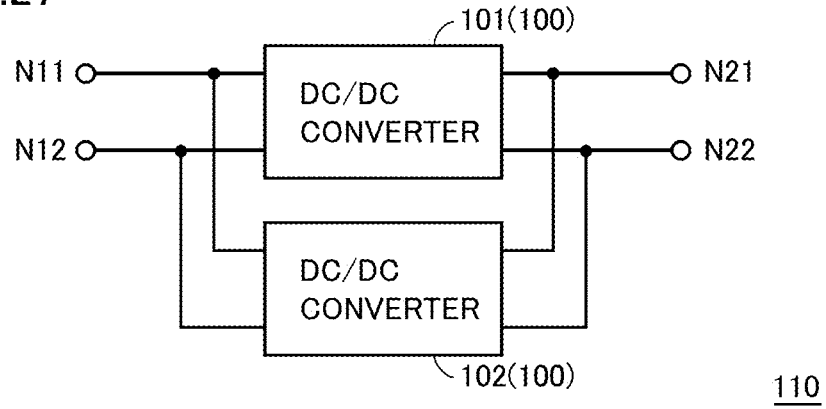
FIG. 27 is a block diagram for explaining a first configuration example of a power conversion device according to a third embodiment.

FIG. 27 is a block diagram illustrating a first configuration example of the power conversion device according to the third embodiment.

Referring to FIG. 27, a power conversion device 110 according to the first example of the third embodiment includes DC/DC converters 101 and 102 connected in parallel. In the third embodiment, each of DC/DC converters 101 and 102 is configured with DC/DC converter 100 according to the first or second embodiment.

In power conversion device 110, in DC/DC converters 101 and 102 connected in parallel, first positive electrode wires 11 (FIG. 1) are connected in common to a power supply terminal N11, and first negative electrode wires 12 (FIG. 1) are connected in common to a power supply terminal N12. Power supply terminal N11 is electrically connected to the positive electrode of first DC power source PS1, and power supply terminal N12 is electrically connected to the negative electrode of first DC power source PS1.

Similarly, in DC/DC converters 101 and 102 connected in parallel, second positive electrode wires 21 (FIG. 1) are connected in common to a power supply terminal N21, and second negative electrode wires 22 (FIG. 1) are connected in common to a power supply terminal N22. Power supply terminal N21 is electrically connected to the positive electrode of second DC power source PS2, and power supply terminal N22 is electrically connected to the negative electrode of first DC power source PS1.

In power conversion device 110 in the first configuration example, power can be transmitted bidirectionally between first DC power source PS1 and second DC power source PS2 using DC/DC converters 101 and 102 (100) connected in parallel. This configuration facilitates application to large power transmission.

Figure 28:
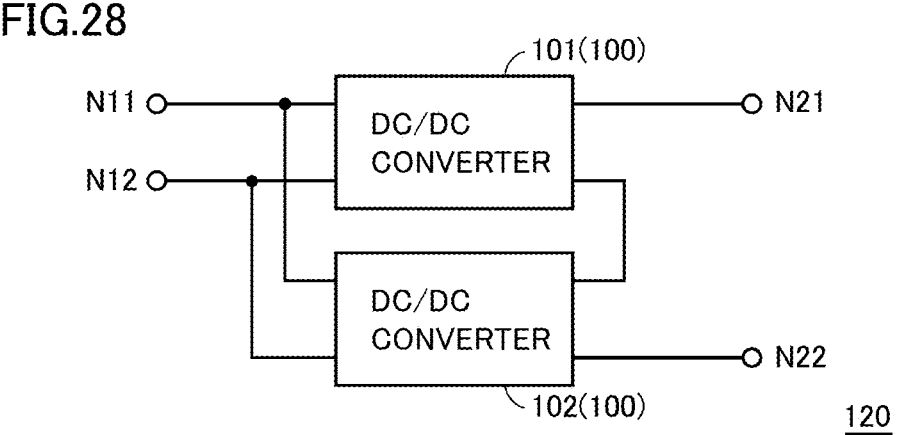
FIG. 28 is a block diagram for explaining a second configuration example of the power conversion device according to the third embodiment.

FIG. 28 is a block diagram illustrating a second configuration example of the power conversion device according to the third embodiment.

Referring to FIG. 28, a power conversion device 120 according to the second example of the third embodiment includes DC/DC converters 101 and 102 connected in series parallel. Power supply terminal N21 is electrically connected to the positive electrode of second DC power source PS2, and power supply terminal N22 is electrically connected to the negative electrode of first DC power source PS1.

First positive electrode wires 11 (FIG. 1) of DC/DC converters 101 and 102 are connected in common to power supply terminal N11, and first negative electrode wires 12 (FIG. 1) are connected in common to power supply terminal N12. That is, DC/DC converters 101 and 102 are connected in parallel on the first DC power source side.

On the other hand, second positive electrode wire 21 of DC/DC converter 101 is connected to power supply terminal N21 electrically connected to the positive electrode of second DC power source PS2. Second negative electrode wire 22 of DC/DC converter 102 is connected to power supply terminal N22 electrically connected to the positive electrode of second DC power source PS2. Furthermore, second positive electrode wire 21 of DC/DC converter 102 is connected to second negative electrode wire 22 of DC/DC converter 101. That is, DC/DC converters 101 and 102 are connected in series on the second DC power source side.

In power conversion device 110 in the second configuration example, power can be transmitted bidirectionally between first DC power source PS1 and second DC power source PS2 using DC/DC converters 101 and 102 (100) connected in series parallel. This configuration facilitates application to power transmission between DC power sources with different voltages. In the configuration in FIG. 28, the connections may be replaced with each other such that the first DC power source sides are connected in series and the second DC power source sides are connected in parallel.

Figure 29:
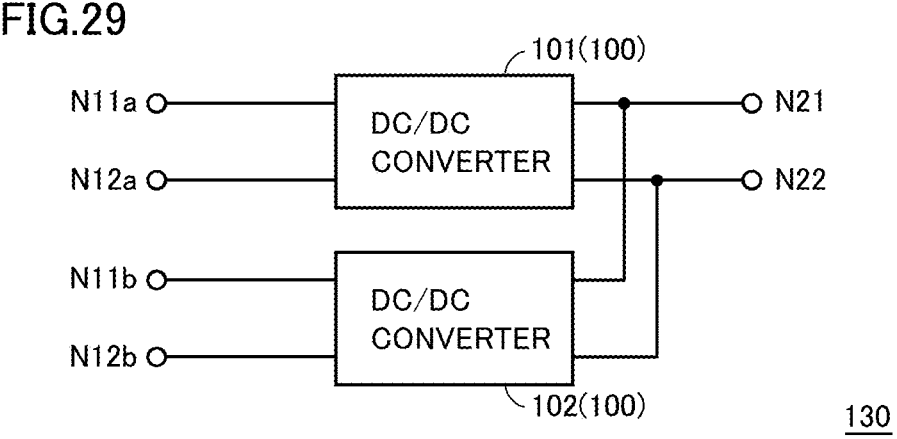
FIG. 29 is a block diagram for explaining a third configuration example of the power conversion device according to the third embodiment.

FIG. 29 is a block diagram illustrating a third configuration example of the power conversion device according to the third embodiment.

Referring to FIG. 29, a power conversion device 130 according to the third example of the third embodiment includes DC/DC converters 101 and 102.

In power conversion device 130, in DC/DC converter 101, first positive electrode wire 11 (FIG. 1) is connected to a power supply terminal N11 *a*, and first negative electrode wire 12 (FIG. 1) is connected to a power supply terminal N12*a*. In DC/DC converter 102, first positive electrode wire 11 (FIG. 1) is connected to a power supply terminal N11*b*, and first negative electrode wire 12 (FIG. 1) is connected to a power supply terminal N12*b*. Separate first DC power sources PS1 are connected to power supply terminals N11*a* and N11*b* and to power supply terminals N12*a* and N12*b*.

On the other hand, second positive electrode wires 21 (FIG. 1) of DC/DC converters 101 and 102 are connected to power supply terminal N21 electrically connected to the positive electrode of second DC power source PS2. Similarly, second negative electrode wires 22 (FIG. 1) of DC/DC converters 101 and 102 are connected to power supply terminal N22 electrically connected to the negative electrode of second DC power source PS2.

In power conversion device 110 in the third configuration example, power can be transmitted bidirectionally between first DC power sources PS1 and second DC power source PS2 which are different in number. In the configuration of FIG. 29, the respective numbers of first DC power sources PS1 and second DC power sources PS2 between which power transmission is performed can be set as desired.

In the third embodiment, control circuit 30 of DC/DC converters 101 and 102 may be configured in common using one controller, or separate controllers may be arranged individually for DC/DC converters 100 and communication may be performed between the controllers to perform drive control.

In the power conversion device according to the third embodiment, a plurality of DC/DC converters 100 according to the first or second embodiment are arranged and connected in parallel or in series to one or more first DC power source(s) PS1 and second DC power source(s) PS2. In particular, by taking advantage of improvement in power conversion efficiency in a region with a small power transmission amount in DC/DC converter 100, steady power conversion efficiency can be improved in power conversion devices 110 to 130 as a whole by applying control such as adjusting burden of the power transmission amount among a plurality of DC/DC converters 100 or stopping power transmission operation in some of DC/DC converters 100 as appropriate.

Other Embodiments

Finally, other embodiments of the present disclosure will be described. The configurations of the embodiments described below are not necessarily applied singly and may be applied in combination with a configuration of another embodiment as long as there is no discrepancy.

(1) In the foregoing embodiments, first switching element Q4A on the positive electrode side of first bridge circuit 41 is defined as "first reference element QB1", second switching element Q3B on the negative electrode side of second bridge circuit 42 is defined as "first diagonal element QO1", third switching element Q1A on the positive electrode side of third bridge circuit 43 is defined as "second reference element QB2", and fourth switching element Q2B on the negative electrode side of fourth bridge circuit 44 is defined as "second diagonal element QO2", as a typical example.

However, the embodiments of the present disclosure are not limited thereto. For example, first switching element Q4B on the negative electrode side of first bridge circuit 41 may be defined as "first reference element QB1", second switching element Q3A on the positive electrode side of second bridge circuit 42 may be defined as "first diagonal element QO1", third switching element Q1B on the negative electrode side of third bridge circuit 43 may be defined as "second reference element QB2", and fourth switching element Q2A on the positive electrode side of fourth bridge circuit 44 may be defined as "second diagonal element QO2".

(2) In the foregoing embodiments, in first converter 10 in FIG. 1, the bridge circuit on the left side is first bridge circuit 41 in which first reference element QB1 is set, and the bridge circuit on the right side is second bridge circuit 42 in which first diagonal element QO1 is set, and in second converter 20 in FIG. 1, the bridge circuit on the right side is third bridge circuit 43 in which second reference element QB2 is set, and the bridge circuit on the left side is fourth bridge circuit 44 in which second diagonal element QO2 is set, as a typical example.

However, the embodiments of the present disclosure are not limited thereto. For example, in first converter 10 in FIG. 1, the bridge circuit on the right side may be first bridge circuit 41 in which first reference element QB1 is set, and the bridge circuit on the left side may be second bridge circuit 42 in which first diagonal element Q01 is set, and in second converter 20 in FIG. 1, the bridge circuit on the left side may be third bridge circuit 43 in which second reference element QB2 is set, and the bridge circuit on the right side may be fourth bridge circuit 44 in which second diagonal element Q02 is set.

(3) In the foregoing embodiments, second DC power source PS2 is a battery, by way of example. However, the embodiments of the present invention are not limited thereto. That is, each of first DC power source PS1 and second DC power source PS2 may be configured with any DC power source. The DC power source may be configured with a battery as described above, or a power storage element such as a large-capacity capacitor, a power supply device that converts AC power from an AC power source such as a commercial system into DC power, a rotating machine (DC motor) having the functions of a power generator and an electric motor in combination, or a unit having the rotating machine (AC motor) and an inverter (AC/DC converter) in combination.

(4) In the foregoing embodiments, in the diagrams such as FIG. 2 illustrating the temporal waveforms of drive signals of the switching elements, the switching period Tsw is divided into ten periods, namely, periods A to J, and a gate pattern that is a combination pattern of the on or off drive signals of the switching elements is set in each of periods A to J, by way of example. The short-circuit prevention time td is equivalent to one period that is each of ten equal parts of the switching period, as a typical example.

However, the embodiments of the present disclosure are not limited thereto, and the switching period Tsw may be divided into any number of parts. Alternatively, the switching period Tsw is not necessarily divided into a plurality of periods, and the phase shift amounts θ1 to θ4 may be continuously changed. The short-circuit prevention time td can be set to any time length in a range that can avoid a simultaneous on state of the positive electrode-side switching elements and the negative electrode-side switching elements.

(5) In the first embodiment, the first reference value Pr1 is preset to correspond to the first power transmission amount P1 when the first phase shift amount θ1 and the second phase shift amount θ2 are 25% of the switching period Tsw, and the second reference value Pr2 is preset to correspond to the second power transmission amount P2 when the third phase shift amount θ3 and the fourth phase shift amount θ4 are 25% of the switching period Tsw, by way of example.

In the second embodiment, the first reference value Pr1 is preset to correspond to the first power transmission amount P1 when the first phase shift amount θ1 and the second phase shift amount θ2 are a preset value smaller than 25% of the switching period Tsw, and the second reference value Pr2 is preset to correspond to the second power transmission amount P2 when the third phase shift amount θ3 and the fourth phase shift amount θ4 are a preset value smaller than 25% of the switching period Tsw, as a typical example. However, the embodiments of the present disclosure are not limited thereto. That is, the first reference value Pr1 can be set to correspond to the first power transmission amount P1 when the first phase shift amount θ1 and the second phase shift amount θ2 are any predetermined α (%) from 0% to 50% of the switching period Tsw. Similarly, the second reference value Pr2 can be set to correspond to the second power transmission amount P2 when the third phase shift amount θ3 and the fourth phase shift amount θ4 are any predetermined β (%) from 0% to 50% of the switching period Tsw. Furthermore, for the first reference value Pr1 and the second reference value Pr2, α and β may be the same value or may be different values.

(6) In the foregoing embodiments, the first to fourth phase shift amounts θ1 to θ4 increase or decrease at the same slope, with respect to increase or decrease of the power transmission amount (output DUTY ratio), as a typical example. However, the embodiments of the present disclosure are not limited thereto. That is, the slope at which each of the first to fourth phase shift amounts θ1 to θ4 changes with respect to change of the power transmission amount (output DUTY ratio) may vary in accordance with a range of the power transmission amount (output DUTY ratio). In step-up charge, the first phase shift amount θ1 and the second phase shift amount θ2 may increase or decrease at different slopes. Similarly, in step-up discharge, the third phase shift amount θ3 and the fourth phase shift amount θ4 may increase or decrease at different slopes.

It should be noted that, for a plurality of embodiments described above, any combinations that are not referred to in the description as well as any appropriate combinations of the configurations described in the embodiments in a range that does not cause inconsistency or contradiction are initially intended at the time of filing.

Embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 3 transformer, 3a first winding, 3b second winding, 10 first converter, 11 first positive electrode wire, 12 first negative electrode wire, 13 first smoothing capacitor, 14 first reactor, 20 second converter, 21 second positive electrode wire, 22 second negative electrode wire, 23 second smoothing capacitor, 24 second reactor, 25 reactor (current detection), 30 control circuit, 31, 33, 35 subtractor, 31a, 31b drive signal, 32, 34, 36 control calculator, 41 first bridge circuit, 42 second bridge circuit, 43 third bridge circuit, 44 fourth bridge circuit, 51 antiparallel diode, 52 parallel capacitor, 100 to 102 DC/DC converter, 110, 120, 130 power conversion device, Dr1 first reference value (output DUTY ratio), Dr2 second reference value (output DUTY ratio), N11, N11a, N11b, N12, N12a, N12b, N21, N22 power supply terminal, P1 first power transmission amount, P2 second power transmission amount, PS1 first DC power source, PS2 second DC power source (battery), Pr1 first reference value (power transmission amount), Pr2 second reference value (power transmission amount), Pr3 third reference value (power transmission amount), Pr4 fourth reference value (power transmission amount), Pref power transmission command value, Q1A to Q4A, Q1B to Q4A semiconductor switching element, QB1 first reference element, QB2 second reference element, QO1 first diagonal element, QO2 second diagonal element, Tsw switching period, t1a, t1 first diagonal ON time, t2, t2a second virtual diagonal ON time, t3a, t3 third diagonal ON time, t4, t4a fourth virtual diagonal ON time, td short-circuit prevention time.

The invention claimed is:

1. A DC/DC converter that performs bidirectional power transmission between a first DC power source and a second DC power source, comprising:
   a transformer having a first winding and a second winding magnetically coupled;
   a first converter connected between the first DC power source and the first winding; and
   a second converter connected between the second DC power source and the second winding, wherein
   the first converter includes
   a first bridge circuit and a second bridge circuit connected in parallel to each other to the first DC power source,
   each of the first, bridge circuit and the second bridge circuit has
     a positive electrode-side switching element and a negative electrode-side switching element connected in series between a positive electrode and a negative electrode of the first DC power source, and
     a diode connected in antiparallel with each of the positive electrode-side switching element and the negative electrode-side switching element of the first bridge circuit or the second bridge circuit, and
   the first winding is connected between a connection point of the positive electrode-side switching element and the negative electrode-side switching element of the first bridge circuit and a connection point of the positive electrode-side switching element and the negative electrode-side switching element of the second bridge circuit, the second converter includes
   a third bridge circuit and a fourth bridge circuit connected in parallel to each other to the second DC power source,
   each of the third bridge circuit and the fourth bridge circuit has
     a positive electrode-side switching element and a negative electrode-side switching element connected in series between a positive electrode and a negative electrode of the second DC power source, and
     a diode connected in antiparallel with each of the positive electrode-side switching element and the negative electrode-side switching element of the third bridge circuit or the fourth bridge circuit, and
   the second winding is connected between a connection point of the positive electrode-side switching element and the negative electrode-side switching element of the third bridge circuit and a connection point of the positive electrode-side switching element and the negative electrode-side switching element of the fourth bridge circuit, the DC/DC converter further comprising
   a control circuit to perform on/off drive control of the respective positive electrode-side switching elements and the respective negative electrode-side switching elements of the first converter and the second converter, wherein
   in first power transmission in which power is transmitted from the first DC power source to the second. DC power source,
   in the first converter, the control circuit performs DC/AC power conversion by performing on/off drive control of the positive electrode-side switching element and the negative electrode-side switching element such that the positive electrode-side switching elements and the negative electrode-side switching elements are alternately turned on at equal intervals with a short-circuit prevention time interposed, in each of the first bridge circuit and the second bridge circuit;
   in the short-circuit prevention time, both of the positive electrode-side switching element and the negative electrode-side switching element are brought to an off state in the first and second bridge circuits,
   in the second converter, when a first power transmission amount by the first power transmission is greater than a predetermined first reference value. the control circuit stops onioff drive of the positive electrode-side switching element and the negative electrode-side switching element in the third bridge circuit and performs on/off drive control of the positive electrode-side switching element and the negative electrode-side switching element in the fourth bridge circuit, whereas when the first power transmission amount is smaller than the first reference value, the control circuit performs AC/DC power conversion by stopping on/off drive of the positive electrode-side switching element and the negative electrode-side switching element in both of the third bridge circuit and the fourth bridge circuit,
   the control circuit sets, as a first phase shift amount, a phase shift amount of an on/off drive signal of a first diagonal element with respect to an on/off drive signal of a first reference element, the first reference element is one switching element of the positive electrode side and the negative electrode side of the first bridge circuit, and the first diagonal element is the other switching element of the positive electrode side and the negative electrode side of the second bridge circuit,
   the control circuit sets, as a second phase shift amount, a phase shift amount of an on/off drive signal of a second diagonal element that is the other switching element of the positive electrode side and the negative electrode side of the fourth bridge circuit with respect to the on/off drive signal of the first reference element, and
   the control circuit calculates an output DUTY ratio based on a power transmission amount between the first DC power source and the second DC power source, and changes the first phase shift amount and the second phase shift amount based on the calculated output DUTY ratio.

2. The DC/DC converter according to claim 1, wherein
   in second power transmission in which power is transmitted from the second DC power source to the first DC power source,
   in the second converter, the control circuit performs DC/AC power conversion by performing on/off drive control of the positive electrode-side switching element and the negative electrode-side switching element such that the positive electrode-side switching elements and the negative electrode-side switching elements are alternately turned on at equal intervals with a short-circuit prevention time interposed, in each of the third bridge circuit and the fourth bridge circuit,
   in the short-circuit prevention time, both of the positive electrode-side switching element and the negative electrode-side switching element, are brought to an off state in the third and fourth bridge circuits, and
   in the first converter, when a second power transmission amount by the second power transmission is greater than a predetermined second reference value, the control circuit stops ori/off drive of the positive electrode-side switching element and the negative electrode-side switching element in the first bridge circuit and performs on/off drive control of the positive electrode-side switching element and the negative electrode-side switching element in the second bridge circuit, whereas when the second power transmission amount is smaller than the second reference value, the control circuit performs AC/DC power conversion by stopping on/off drive of the positive electrode-side switching element and the negative electrode-side switching element in both of the first bridge circuit and the second, bridge circuit.

3. The DC/DC converter according to claim 1, further comprising
a current sensor to detect charge or discharge current of the second DC power source, wherein
the control circuit changes the first phase shift amount and the second phase shift amount such that the charge or discharge current detected by the current sensor approaches a current command value,
in the first power transmission in which the current command value is set so as to charge the second DC power source, when a phase difference between the first phase shift amount and the second phase shift amount is greater than the short-circuit prevention period of the first and second bridge circuits, the control circuit determines that the first power transmission amount is greater than the first reference value, and stops on/off drive of the positive electrode-side switching element and the negative electrode-side switching element in the third bridge circuit, whereas when the phase difference is smaller than the short-circuit prevention period of the first and second bridge circuits, the control circuit determines that the first power transmission amount is smaller than the first reference value, and stops on/off drive of the positive electrode-side switching element and the negative electrode-side switching element in both of the third bridge circuit and the fourth bridge circuit.

4. The DC/DC converter according to claim 3, wherein in the first power transmission,
in a range in which the first power transmission amount is smaller than the first reference value, as the first power transmission amount increases, the control circuit decreases the first phase shift amount from a maximum value when the first power transmission amount is zero, and the control circuit virtually changes the second phase shift amount by a same amount as in the first phase shift amount, and
in a range in which the first power transmission amount is greater than the first reference value, as the first power transmission amount increases, the control circuit decreases the first phase shift amount and increases the second phase shift amount from a reference phase shift amount that is the first phase shift amount and the second phase shift amount when the first power transmission amount is the first reference value.

5. The DC/DC converter according to claim 3, wherein in the first power transmission,
in a range in which the first power transmission amount is smaller than the first reference value, as the first power transmission amount increases, the control circuit decreases the first phase shift amount from a maximum value when the first power transmission amount is zero, and the control circuit virtually changes the second phase shift amount by a same amount as in the first phase shift amount, and
in a range in which the first power transmission amount is from the first reference value to a third reference value preset to a value greater than the first reference value, as the first power transmission amount increases, the control circuit decreases the first phase shift amount and increases the second phase shift amount from a reference phase shift amount that is the first phase shift amount and the second phase shift amount when the first power transmission amount is the first reference value, and
in a range in which the first power transmission amount is greater than the third reference value, as the first power transmission amount increases, the control circuit increases the second phase shift amount from a value when the first power transmission amount is the third reference value, and the control circuit keeps the first phase shift amount at a value when the first power transmission amount is the third reference value.

6. The DC/DC converter according to claim 1, wherein in a range in which the first power transmission amount is greater than the first reference value, as the first power transmission amount increases, the control circuit gradually decreases the second phase shift amount from a reference phase shift amount that is the first phase shift amount when the first power transmission amount is the first reference value, and gradually increases the second phase shift amount from an initial value, and
the initial value of the second phase shift amount is set such that a phase difference between the initial value and the reference phase shift amount is equivalent to the short-circuit prevention time.

7. The DC/DC converter according to claim 3, wherein the first reference value is preset to correspond to the first power transmission amount when the first phase shift amount and the second phase shift amount have a predetermined ratio to a switching period in which each of the switching elements is driven on/off once.

8. The DC/DC converter according to claim 7, wherein the predetermined ratio is preset to a value equal to or smaller than 25%.

9. A power conversion device comprising a plurality of the DC/DC converters according to claim 1,
wherein the DC/DC converters are connected in series or in parallel to one or a plurality of the first DC power sources and the second DC power sources.

10. The DC/DC converter according to claim 1, further comprising:
a current sensor to detect charge or discharge current of the second DC power source, wherein the control circuit changes the first phase shift amount and the second phase shift amount such that the charge or discharge current detected by the current sensor approaches a current command value.

11. The DC/DC converter according to claim 1, wherein an initial value of the second phase shift amount is set such that a phase difference between the initial value and a reference phase shift amount is equivalent to the short-circuit prevention time.

* * * * *